United States Patent [19]

Kume et al.

[11] Patent Number: 5,146,879
[45] Date of Patent: Sep. 15, 1992

[54] VARIABLE COMPRESSION RATIO APPARATUS FOR INTERNAL COMBUSTION ENGINE

[75] Inventors: Tateo Kume; Kazuhiro Shiraishi, both of Kameoka; Masahiko Matsuda, Kyoto; Toru Okada, Kameoka, all of Japan

[73] Assignee: Mitsubishi Jidosha Kogyo Kabushiki Kaisha, Tokyo, Japan

[21] Appl. No.: 642,335

[22] Filed: Jan. 17, 1991

[30] Foreign Application Priority Data

Jan. 17, 1990 [JP] Japan .................................. 2-7527
Jan. 17, 1990 [JP] Japan .................................. 2-7528
May 15, 1990 [JP] Japan ................................ 2-125166

[51] Int. Cl.$^5$ ............................................ F02B 75/02
[52] U.S. Cl. ............................. 123/48 B; 123/78 BA; 123/78E
[58] Field of Search ............... 123/48 B, 78 BA, 78 E, 123/78 F

[56] References Cited

U.S. PATENT DOCUMENTS

| 1,386,114 | 8/1921 | Jedrykowski . | |
|---|---|---|---|
| 2,427,668 | 9/1947 | Gill | 123/48 B |
| 3,185,138 | 5/1965 | Druzynski . | |
| 4,254,743 | 3/1981 | Reid et al. | 123/48 B |
| 4,406,256 | 9/1983 | Akkerman | 123/78 E |
| 4,687,348 | 8/1987 | Naruoka et al. | 123/48 B |
| 4,721,073 | 1/1988 | Naruoka et al. | 123/78 BA |
| 4,864,975 | 9/1989 | Hasegawa | 123/78 BA |

FOREIGN PATENT DOCUMENTS

| 0066350 | 8/1982 | European Pat. Off. . | |
|---|---|---|---|
| 58-38343 | 3/1983 | Japan . | |
| 58-172431 | 10/1983 | Japan . | |
| 60-65216 | 4/1985 | Japan . | |
| 61-261631 | 11/1986 | Japan . | |
| 63-12837 | 1/1988 | Japan | 123/78 BA |
| 63-332972 | 7/1988 | Japan . | |

Primary Examiner—David A. Okonsky
Attorney, Agent, or Firm—Wegner, Cantor, Mueller & Player

[57] ABSTRACT

A variable compression ratio apparatus is provided for use in an internal combustion engine. The apparatus has an eccentric sleeve rotatably arranged in one of pivot portions at opposite ends of a connecting rod so as to make a bearing hole of the connecting rod and a pin, which extends through the bearing hole, eccentric relative to each other. The apparatus also has an eccentric sleeve lock device capable of fixing rotation of the eccentric sleeve at a desired position. The lock device includes a pin member engageable with one of engagement portions formed in the eccentric sleeve and a piston-type fluid pressure drive system. The drive system is adapted to produce a pressure difference between fluid pressure chambers formed at opposite sides of a piston portion, which is connected to the pin member, in a state that the fluid pressure chambers are applied with a prescribed fluid pressure, whereby the piston portion is moved to drive the pin member.

22 Claims, 23 Drawing Sheets

FIG. 14
FIG. 15
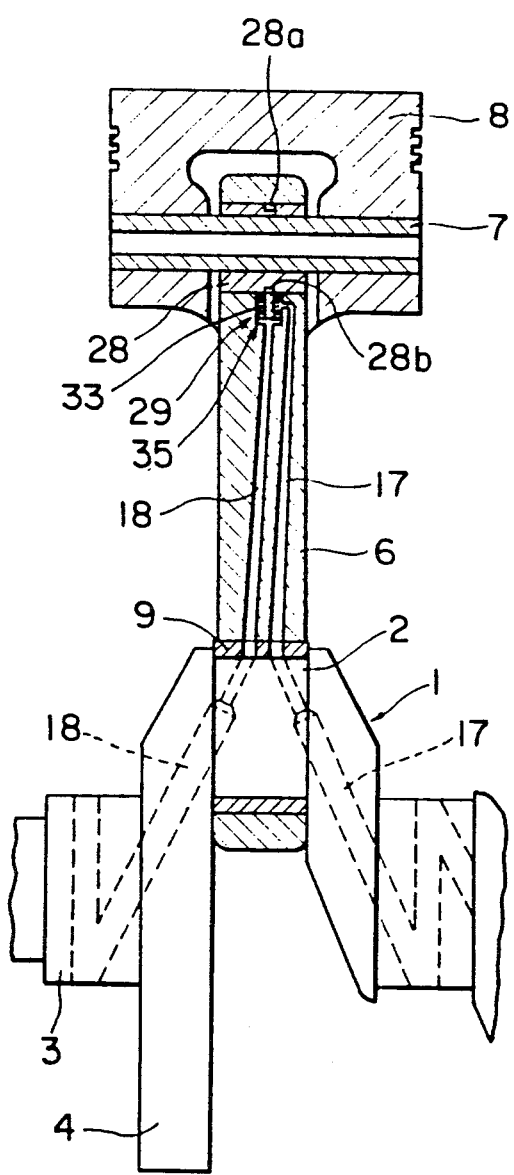
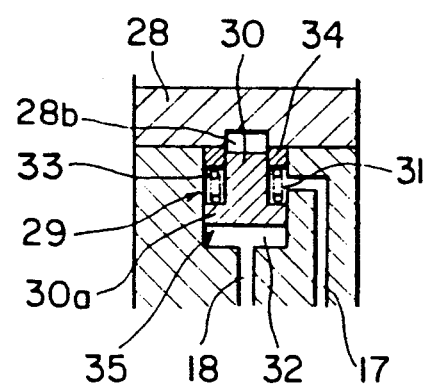

VARIABLE COMPRESSION RATIO APPARATUS FOR INTERNAL COMBUSTION ENGINE

BACKGROUND OF THE INVENTION a) Field of the Invention

The present invention relates to a variable compression ratio apparatus for an internal combustion engine which may hereinafter be called an "engine" as needed.

b) Description of the Related Art

A variety of engines have been proposed to date, in which the compression ratio can be changed to increase the thermal efficiency in an operation range not higher than a medium engine load range with a view toward improving the fuel cost and the like while preventing occurrence of knocking in a engine load range higher than the medium engine load range or in a high engine speed (revolution) range.

Such compression ratio changing systems are disclosed, for example, in Japanese Patent Publication No. 32972/1988. According to the compression ratio changing system disclosed in this patent publication, one of pivot portions formed at opposite ends of each connecting rod of an engine is provided with an eccentric bearing which makes a bearing hole of the connecting rod and a pin, said pin extending through the bearing hole, eccentric relative to each other so that the eccentric bearing is allowed to undergo free rotation by a rotating force produced by the eccentricity between a load from an associated piston and a reaction force from the pin. A hydraulically-actuated lock means is also provided, which changes over the state of the eccentric bearing between a free rotation state and a fixed state by driving a lock pin which is movable in a radial direction of the bearing. Further, the pressure of a working fluid, namely, hydraulic fluid (e.g., a working oil) to be supplied to the lock means is controlled by a signal from a computer, which in turn receives signals from a piston position detecting means and operation condition detecting means, under such conditions that a fluid pressure (e.g., an oil pressure) is always applied to the lock means during locking but no fluid pressure is applied to the lock means during unlocking.

In such a conventional compression ratio changing system for an internal combustion engine, the fluid pressure is always applied to the lock means during locking as mentioned above. Since the working fluid is applied to only one of fluid pressure chambers defined on opposite sides of a piston in the above situation, the fluid pressure in the fluid pressure chamber may substantially fluctuate by centrifugal force and/or acceleration of reciprocal motion of the connecting rod. This may result in an unsure locking operation, thereby posing the potential problem that the reliability at the time of locking may be reduced.

SUMMARY OF THE INVENTION

The present invention has been completed with such a potential problem in view. A first object of the present invention is therefore to provide a variable compression ratio apparatus for an internal combustion engine, which can prevent a locking/unlocking operation by a lock means from becoming unsure under centrifugal force and/or acceleration of reciprocal motion of an associated connecting rod.

In one aspect of the present invention, there is thus provided a variable compression ratio apparatus for an internal combustion engine having at least one cylinder, a piston reciprocally disposed within the cylinder and a connecting rod pivotally connected at one end thereof to the piston and at the other end thereof to a crankshaft, which comprises:

an eccentric sleeve rotatably arranged in one of pivot portions at opposite ends of the connecting rod so as to make a bearing hole of the connecting rod and a pin, which extends through the bearing hole, eccentric relative to each other; and an eccentric sleeve lock means capable of fixing rotation of the eccentric sleeve at a desired position, said eccentric sleeve lock means comprising:

a pin member engageable with one of engagement portions formed in the eccentric sleeve, and a piston-type fluid pressure drive system having a means for producing a pressure difference between fluid pressure chambers formed at opposite sides of a piston portion, which is connected to the pin member, in a state that the fluid pressure chambers are applied with a prescribed fluid pressure, whereby the piston portion is moved to drive the pin member.

In another aspect of the present invention, there is also provided a variable compression ratio apparatus for an internal combustion engine having at least one cylinder, a piston reciprocally disposed within the cylinder and a connecting rod pivotally connected at one end thereof to the piston and at the other end thereof to a crankshaft, which comprises:

an eccentric sleeve rotatably arranged in a pivot portion at the other end of the connecting rod so as to make a bearing hole of the connecting rod and the crankshaft, which extends through the bearing hole, eccentric relative to each other; and an eccentric sleeve lock means capable of fixing rotation of the eccentric sleeve at a desired position, said eccentric sleeve lock means comprising:

a pair of flange portions formed to flank the connecting rod at opposite ends of the eccentric sleeve, a pin member provided inside the connecting rod such that the pin member is allowed to project toward one of the flange portions, a first engagement portion provided on one of the flange portions and engageable with the pin member when the pin member projects out toward said one of the flange portions, a second engagement portion provided on the other flange portion and engageable with the pin member when the pin member projects out toward the other flange portion, and a piston-type fluid pressure drive system having a means for producing a pressure difference between fluid pressure chambers formed at opposite sides of a piston portion, which is connected to the pin member, in a state that the fluid pressure chambers are applied with a prescribed fluid pressure, whereby the piston portion is moved along an axis of the eccentric sleeve to drive the pin member such that the pin member is allowed to project out from the connecting rod toward one of the flange portions.

In a further aspect of the present invention, there is also provided a variable compression ratio apparatus for an internal combustion engine having at least one cylinder, a piston reciprocally disposed within the cylinder and a connecting rod pivotally connected at one end thereof to the piston and at the other end thereof to a crankshaft, which comprises:

an eccentric sleeve rotatably arranged in a pivot portion at said one end of the connecting rod so as to make a bearing hole of the connecting rod and a piston pin, which extends through the bearing hole, eccentric relative to each other; and an eccentric sleeve lock means capable of fixing rotation of the eccentric sleeve at a desired position, said eccentric sleeve lock means comprising:

a pin member provided inside the connecting rod movably from the inside of the connecting rod in a direction crossing the direction of an axis of the eccentric sleeve such that the pin member is allowed to project out toward the eccentric sleeve, first and second engagement portions formed on the eccentric sleeve with a desired angular interval therebetween, one of said first and second engagement portions being engageable with the pin member when the pin member projects out toward the eccentric sleeve; and a piston-type fluid pressure drive system having a means for producing a pressure difference between fluid pressure chambers formed at opposite sides of a piston portion, which is connected to the pin member, in a state that the fluid pressure chambers are applied with a prescribed fluid pressure, whereby the piston portion is moved in the direction crossing the axis of the eccentric sleeve to drive the pin member such that the pin member is allowed to project out from the inside of the connecting rod toward the eccentric sleeve.

In a still further aspect of the present invention, there is also provided a variable compression ratio apparatus for an internal combustion engine having at least one cylinder, a piston reciprocally disposed within the cylinder and a connecting rod pivotally connected at one end thereof to the piston and at the other end thereof to a crankshaft, comprising:

an eccentric sleeve rotatably arranged in either one of pivot portions at both the ends of the connecting rod so as to make a bearing hole of the connecting rod and a pin, which extends through the bearing hole, eccentric relative to each other; and an eccentric sleeve lock means for actuating a pin member, which is movable along an axis of the eccentric sleeve, such that the pin member is brought into engagement with one of engagement portions formed in the eccentric sleeve and rotation of the eccentric sleeve is fixed at a desired position.

The apparatus of the present invention can bring about the merit that the pressure difference between both the fluid pressure compartments is not changed by a variation in the engine speed or crank angle and the pin member can surely operate even under the influence of centrifugal force, acceleration of reciprocal motion of the connecting rod, or the like.

The apparatus of the present invention can also bring above the merit that the pin member can be actuated without failure even when the delivery ability of a compression means for supplying a high fluid pressure is low.

Further, the apparatus of the present invention can also bring about the merit that the operation of the pin member is not rendered unsure even under the influence of inertia force produced by reciprocation or the like of the connecting rod and the reliability of the operation of the eccentric sleeve can be improved.

A second object of the present invention is to provide a variable compression ratio apparatus for an internal combustion engine, which can obviate breakage of a projected portion of a lock pin or a corresponding engagement portion of an eccentric bearing due to a strong collision between the projected portion of the lock pin and the engagement portion of the eccentric bearing upon changing the compression ratio.

This second object of the present invention has been achieved by providing a hydraulic piston to absorb a shock which may be produced between the lock pin and the eccentric sleeve upon changing the compression ratio.

BRIEF DESCRIPTION OF THE DRAWINGS

FIGS. 1-8 illustrates a variable compression ratio apparatus according to a first embodiment of the present invention, which is suitable for use in an internal combustion engine, in which:

FIG. 1 shows the overall construction of the apparatus at a low-compression ratio, FIG. 2 is a front elevation of a connecting rod at the low compression ratio, FIG. 3 shows the overall construction of the apparatus at a high compression ratio, FIG. 4 is a front elevation of the connecting rod at the high compression ratio, FIG. 5 is an enlarged fragmentary cross-section of a portion indicated by V in FIGS. 1 and 3, FIG. 6 is a cross-section of a fluid pressure drive system at the low compression ratio, FIG. 7 is a cross-section of the fluid pressure drive system at the high compression ratio, and FIG. 8 is a hydraulic circuit diagram of the fluid pressure drive system;

FIGS. 9-13 illustrate a variable compression ratio apparatus according to a second embodiment of the present invention, which is suitable for use in an internal combustion engine, in which:

FIG. 9 shows the overall construction of the apparatus at a low compression ratio, FIG. 10 is the overall construction of the apparatus at a high compression ratio, FIG. 11 is a cross-section of a fluid pressure drive system at the low compression ratio, FIG. 12 is a cross-section of the fluid pressure drive system at the high compression ratio, and FIG. 13 is a hydraulic circuit diagram of the fluid pressure drive system;

FIGS. 14 and 15 show a variable compression ratio apparatus according to a third embodiment of the present invention, which is suitable for use in an internal combustion engine, in which:

FIG. 14 shows the overall construction of the apparatus, in which some parts have been cut off, and FIG. 15 is a cross-section of a fluid pressure drive system of the apparatus;

FIGS. 16 and 17 depict a variable compression ratio apparatus according to a fourth embodiment of the present invention, which is suitable for use in an internal combustion engine, in which:

FIG. 16 shows the overall construction of the apparatus, in which some parts have been cut off, and FIG. 17 is a cross-section of a fluid pressure drive system of the apparatus;

FIGS. 18-25 illustrates a variable compression ratio apparatus according to a fifth embodiment of the present invention, which is suitable for use in an internal combustion engine, in which:

FIG. 18 shows the overall construction of the apparatus at a low-compression ratio, FIG. 19 is a front elevation of a connecting rod at the low compression ratio, FIG. 20 shows the overall construction of the apparatus at a high compression ratio, FIG. 21 is a front elevation of the connecting rod at the high compression ratio, FIG. 22 is a enlarged fragmentary cross-section of a portion indicated by XXII in FIGS. 18 and 20, FIG. 23 is a cross-section of a fluid pressure drive system at the low compression ratio, FIG. 24 is a cross-section of the fluid pressure drive system at the high compression ratio, and FIG. 25 is a hydraulic circuit diagram of the fluid pressure drive system;

DETAILED DESCRIPTION OF THE EMBODIMENTS

Figure 1:
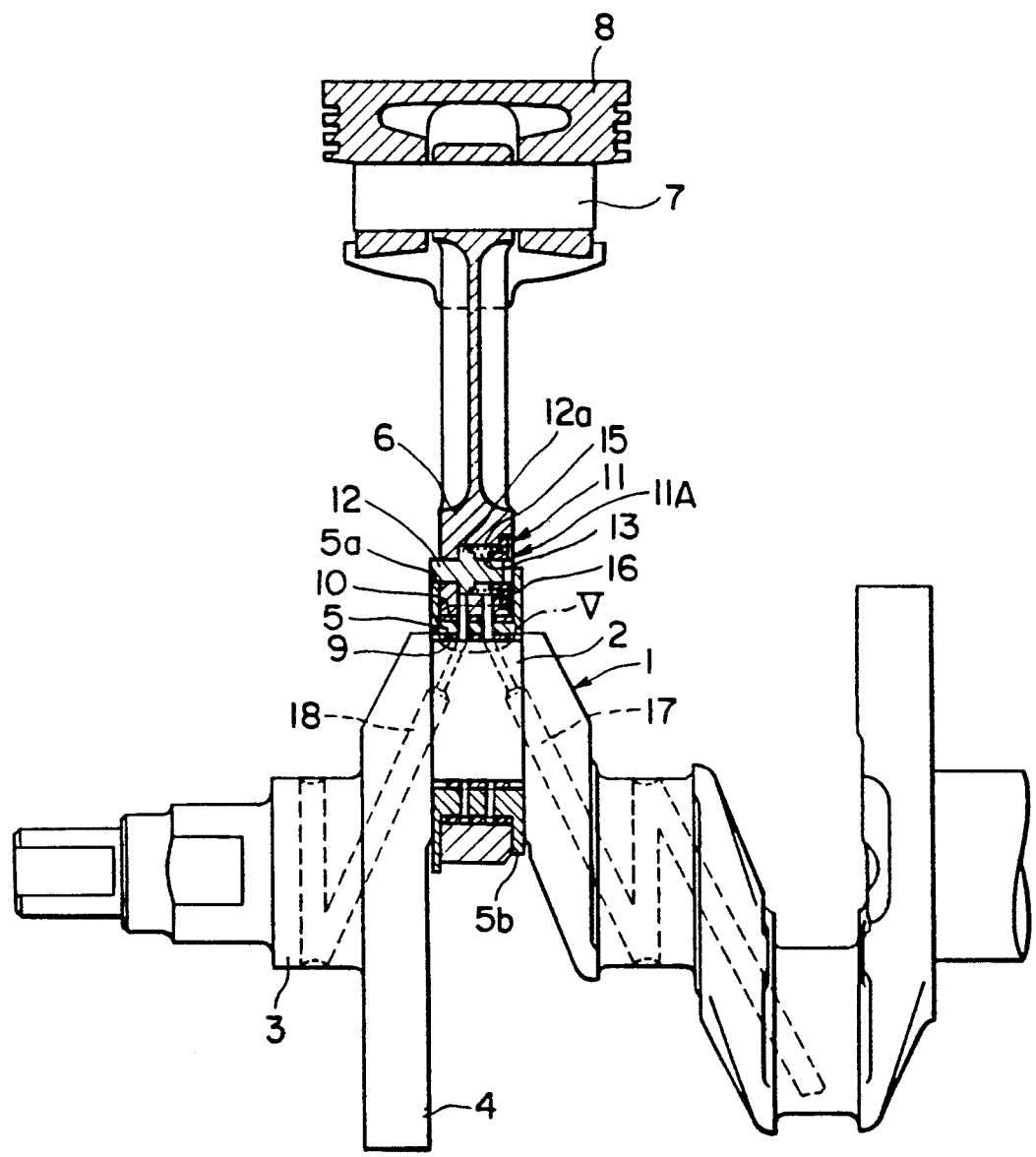

First of all, the first embodiment will be described.

As is illustrated in FIG. 1 to FIG. 4, a connection rod 6 is pivoted at a small end thereof on a piston pin 7 of a piston 8 reciprocally disposed within a cylinder of a gasoline engine (internal combustion engine) and is also pivoted at a big end thereof on a crankpin 2 of a crankshaft 1.

In a pivot portion of the big end of the connecting rod 6, there is formed a bearing hole of the connecting rod. Also provided for rotation at the pivot portion is an eccentric sleeve 5 which makes the bearing hole and the crankpin 2, a shaft extending through the bearing hole, eccentric relative to each other. Namely, the center of an inner peripheral circle of the eccentric sleeve 5 and that of its outer peripheral circle are not registered, and a minimum eccentric position can be taken when the outer periphery of the crankpin 2 is turned over 180° from a maximum eccentric position.

Figure 5:
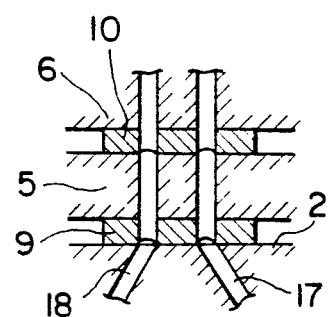

Between an inner peripheral wall of the eccentric sleeve 5 and an outer peripheral wall of the crankpin 2, a metal bearing 9 is interposed in a form attached to the inner peripheral wall of the eccentric sleeve 5 as illustrated in detail in FIG. 5. Also disposed between an outer peripheral wall of the eccentric sleeve 5 and an inner peripheral wall of the bearing hole of the connecting rod 6 is another metal bearing 10 which is attached to the inner peripheral wall of the bearing hole of the connecting rod 6. Accordingly, relative sliding movements are feasible between the eccentric sleeve 5 and the crankpin 2 and also between the eccentric sleeve 5 and the bearing hole of the connecting rod 6.

An eccentric sleeve lock means 11 is also provided. This eccentric sleeve lock means 11 is equipped with a stopper pin 12 which is movable as a pin member in the direction of an axis of the eccentric sleeve 5, in other words, in the direction of an axis of the crankshaft 1. The stopper pin 12 is actuated by a fluid pressure drive system 11A as a piston-type fluid pressure drive system for the stopper pin, whereby the stopper pin 1 is brought into engagement with either one of two engagement portions 5a,5b formed in paired flange portions, respectively. The flange portions are formed on opposite ends of the eccentric sleeve 5 in such a way that the connecting rod 6 is flanked by the flange portions. As a result, rotation of the eccentric sleeve 5 can be fixed selectively at either one of the two positions (i.e., the maximum eccentric position and the minimum eccentric position).

Figure 6:
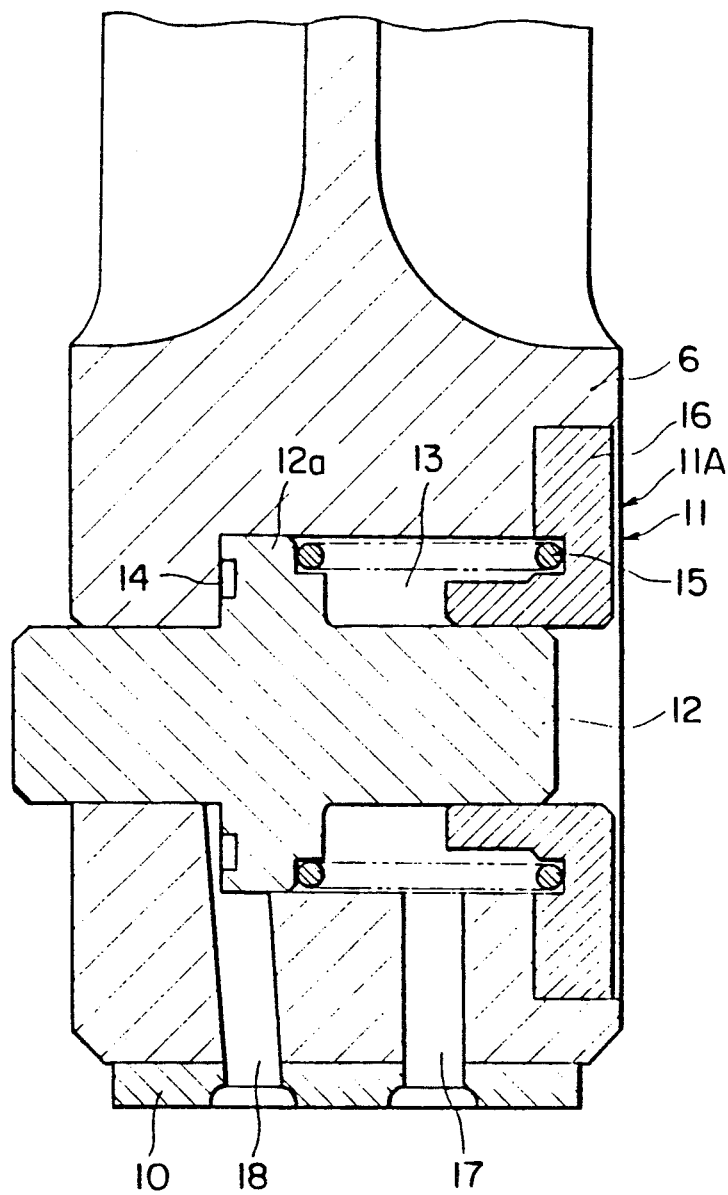
Figure 7:
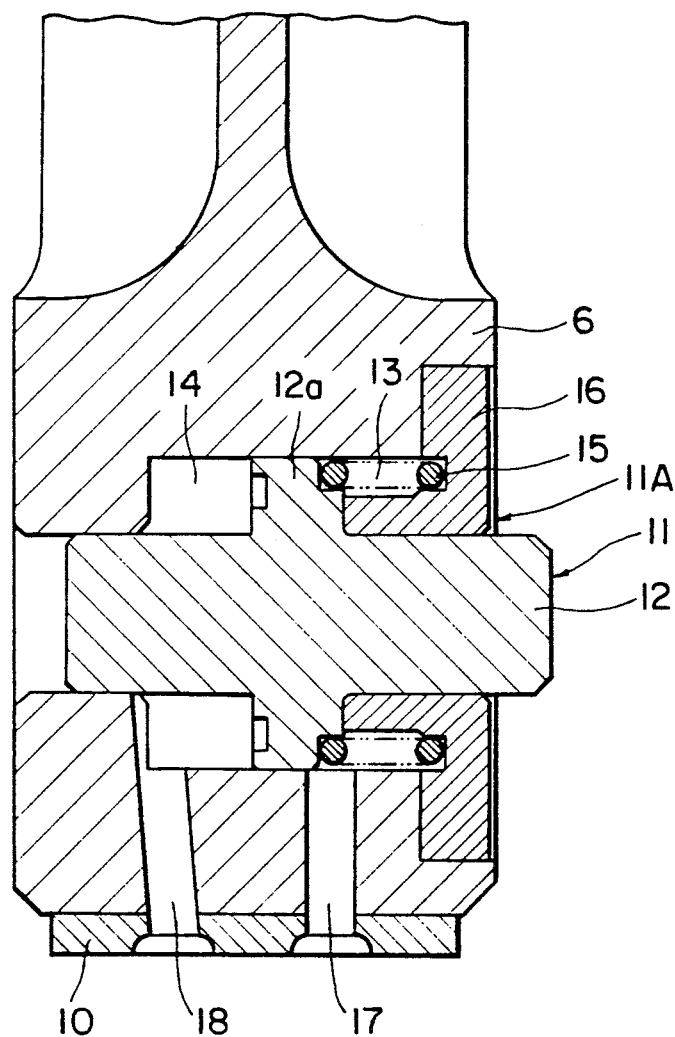

This eccentric sleeve lock means 11 will next be described in further detail. As is illustrated in FIGS. 6 and 7, the stopper pin 12 is centrally enlarged in diameter to define a piston portion 12a in the form of an integral flange. The stopper pin 12 with the piston portion 12a integrated therewith is fitted in a through-hole formed in the big end of the connecting rod 6. This through-hole extends in the direction of the axis of the crankshaft through the big end of the connecting rod 6 and is formed as a three-stage hole portion having three diameters. A small-diameter hole portion located at one end has substantially the same diameter as the stopper pin 12, a medium-diameter hole portion located at an intermediate portion has substantially the same diameter as the piston portion 12a, and a large-diameter portion located at the other end is formed with a diameter greater than that of the piston portion 12a.

Accordingly, when the stopper pin 12 with the piston portion 12a integrated therewith is inserted in the through-hole, the stopper pin 12 is placed fluid tight in the small-diameter hole portion of the through-hole and the piston portion 12a is placed fluid tight in the medium-diameter hole portion of the through-hole. After insertion of a return spring 15, a cap 16 having substantially the same diameter as the through-hole and centrally defining a through-opening of substantially the same diameter as the stopper pin 12 is fitted and the cap 16 is fixed on the connecting rod 6 by bolts or the like. The stopper pin 12 is hence fittingly inserted fluid tight at one end portion thereof in the small-diameter portion of the through-hole and at the other end portion in the through-opening of the cap 16 so that the medium-diameter portion of the through-hole is divided into two chambers 13,14 by the piston portion 12a. Fluid pressure passages 17,18 are connected to the chambers 13,14, respectively. These two chambers are therefore provided as fluid pressure chambers 13,14 formed on opposite sides of the piston portion 12a. The return spring 15 is disposed in the fluid pressure chamber 13 to bias the stopper pin 12, which has the piston portion 12a integrated therewith, toward the fluid pressure chamber 14. It is to be noted that the pressure-receiving areas on both sides of the piston portion 12a are set equal to each other.

By the piston portion 12a integrally formed with the stopper pin 12, the fluid pressure chambers 13,14, the return spring 15, the cap 16 and the like, there is constructed a piston-type fluid pressure drive system 11A which can drive the stopper pin 12 by moving the piston portion 12a integrated with the stopper pin 12.

Figure 2:
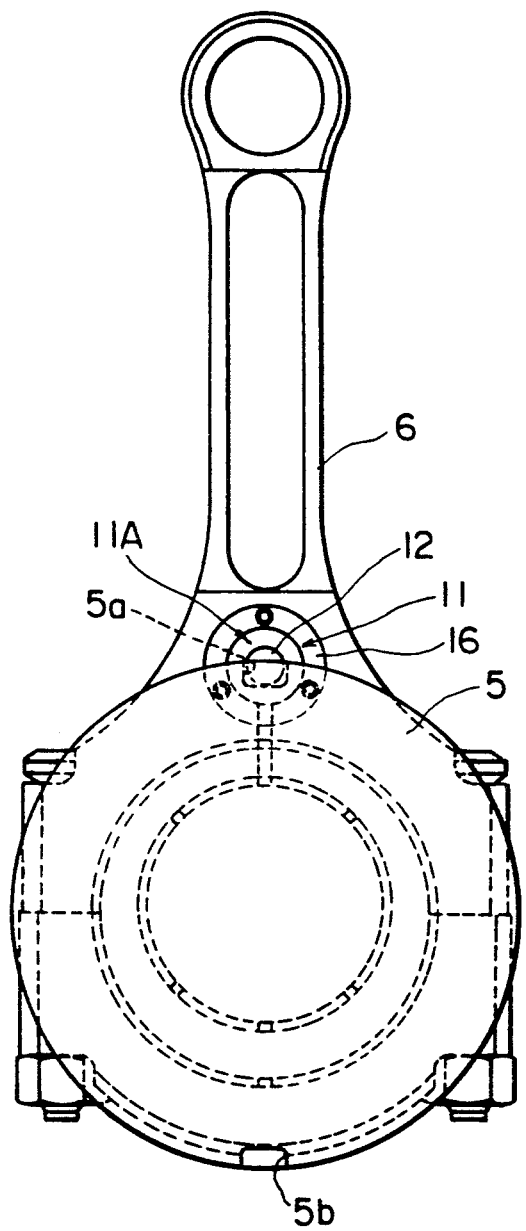
Figure 3:
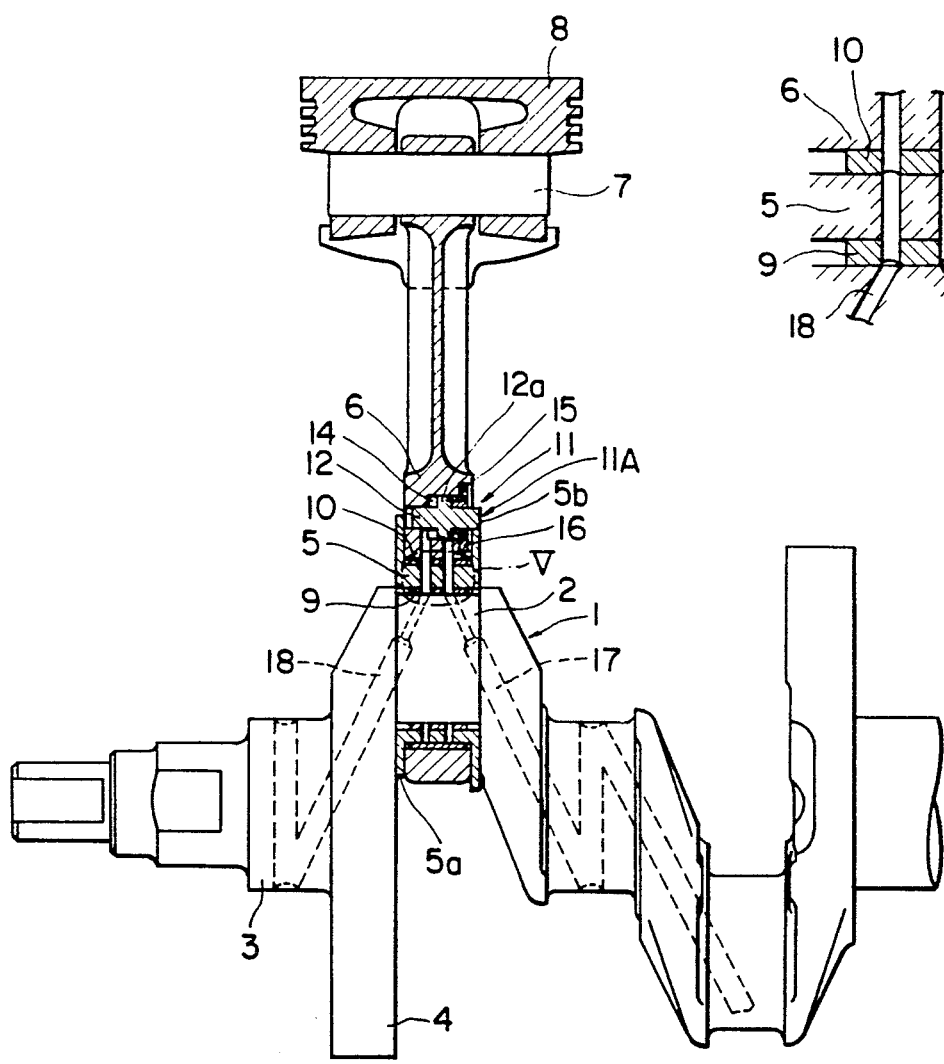
Figure 4:
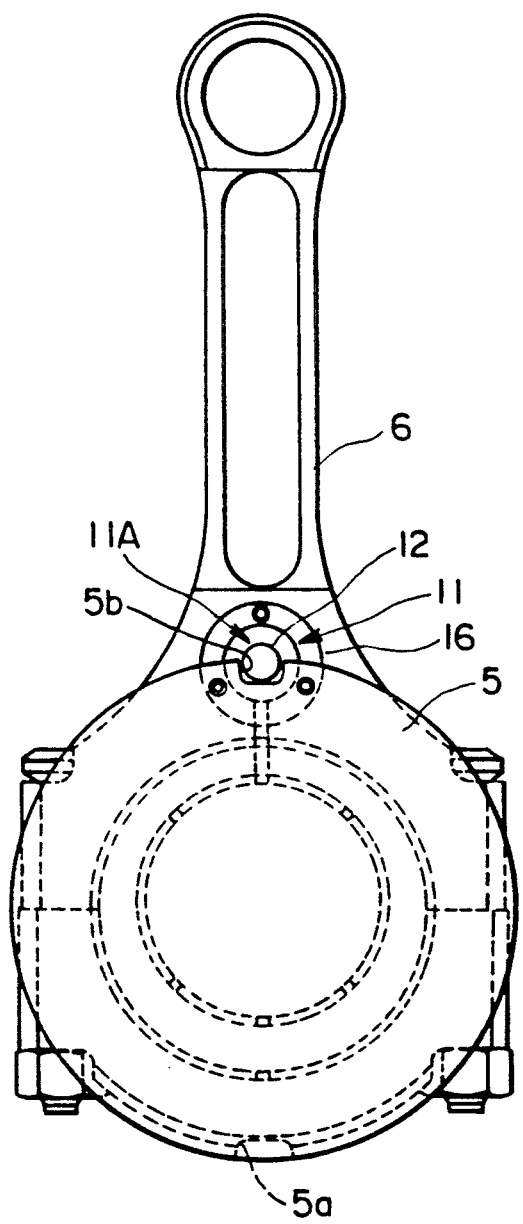

The eccentric sleeve 5 has the flange portions which, as shown in FIGS. 1-4, are axially spaced from each other such that the big end of the connection rod 6 is flanked by the flange portions. At the position of one of the flange portions where the eccentric sleeve 5 takes the minimum eccentric position, the engagement portion 5a in the form of a notch is formed. At the position of the other flange portion where the eccentric sleeve 5 assumes the maximum eccentric position, the other engagement portion 5b in the form of a notch is formed. When the stopper pin 12 has moved rightwards and has taken a first position as shown in FIGS. 3 and 7, the stopper pin 12 engages the engagement portion 5b and the eccentric sleeve 5 is fixed at the maximum eccentric position on the big end of the connecting rod 6 as illustrated in FIGS. 3 and 4. When the stopper pin 12 has moved leftwards and has taken a second position as depicted in FIGS. 1 and 6, the stopper pin 12 engages the engagement portion 5a and the eccentric sleeve 5 is fixed at the minimum eccentric position on the big end of the connecting rod 6 as shown in FIGS. 1 and 2.

When the eccentric sleeve 5 is fixed at the maximum eccentric position on the big end of the connecting rod 6, the connecting rod 6 is brought into a state apparently most extended so that a high compression ratio state can be realized. When the eccentric sleeve 5 is fixed at the minimum eccentric position thereof on the big end of the connecting rod 6, the connecting rod 6 takes a state apparently most contracted so that a low compression ratio state can be realized. In the low compression ratio state, the compression ratio is chosen to be at a level such that the engine does not develop knocking. Such a compression ratio is substantially the same as a value set for conventional engines. In the high compression ratio state, the compression ratio is therefore set at a value higher than that set for conventional engines.

Also provided are a means for applying a prescribed fluid pressure (the standard fluid pressure) in advance to both the fluid pressure chambers 13,14 through the fluid pressure passages 17,18, respectively and another means for applying a fluid pressure (the standard fluid pressure + α) higher than the above standard fluid pressure to the fluid pressure chamber 14 so as to move the stopper pin 12, which has the piston portion 12a integrated therewith, toward the fluid pressure chamber 13 against the biasing force of the return spring 15.

Namely, the fluid pressure passages 17,18 successively extend, as shown in FIGS. 1 and 3, through a crankjournal 3 of the crankshaft 1, a crankarm 4, the crankpin 2, the metal bearing 10 and the big end of the connecting rod 6, and are connected to the fluid pressure chambers 13,14, respectively.

Relative sliding movements take place between the metal bearing 9 and the crankpin 2 and also between the metal bearing 10 and the eccentric sleeve 5. Accordingly, the inner peripheral wall of each of the metal bearings 9,10 defines two endless grooves which extend over 360° in the inner peripheral wall and are in communication with the fluid pressure passages 17,18, respectively. In addition, holes are formed through the wall of the metal bearing 9 in continuation with the respective grooves and hence in registration with the respective fluid pressure passages 17,18 which are formed in the eccentric sleeve 5. Further, similar holes are formed through the wall of the metal bearing 10 in continuation with the respective grooves and hence in registration with the respective fluid pressure passages 17,18 which are formed in the big end of the connecting rod 6.

Figure 8:
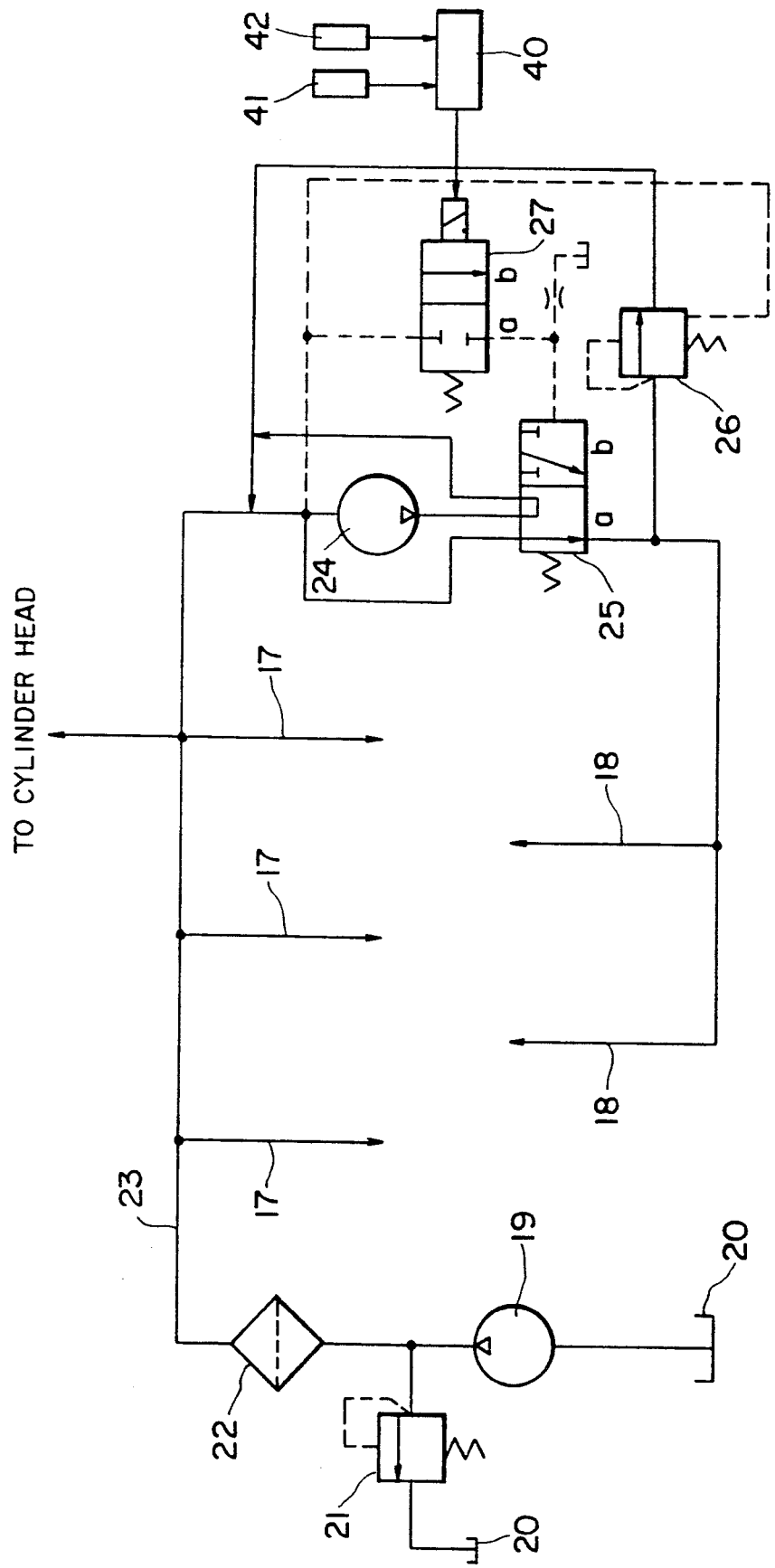

As is illustrated in FIG. 8, the fluid pressure passage 17 outside the crankshaft is connected to a side of a main gallery 23 and the fluid pressure passage 18 outside the crankshaft is connected to a side of a subordinate fluid pump 24 or to the side of the main gallery 23. Namely, a hydraulic fluid (e.g., a lubricating oil) from a fluid tank or fluid pan 20 is supplied as a hydraulic fluid of a desired fluid pressure (i.e., a fluid pressure for supplying the standard fluid pressure) by a fluid pump 19, which is provided with a relief valve 21, to the main gallery 23 via a fluid filter 22. From this main gallery 23, the hydraulic fluid of the standard fluid pressure is supplied through the fluid pressure passage 17. In addition, the hydraulic fluid from the main gallery 23 is supplied to the subordinate fluid pump 24 and is then discharged with a still higher fluid pressure (the standard fluid pressure + α). It is to be noted that either the fluid pressure from the subordinate fluid pump 24 or the fluid pressure from the main gallery 23 is selectively supplied to the fluid pressure passage 18 by way of a directional control valve 25. Namely, when the directional control valve 25 is set at position a as shown in FIG. 8, the standard fluid pressure is supplied from the main gallery 23 to the fluid pressure passage 18. When the directional control valve 25 is set at position b, the higher fluid pressure (the standard fluid pressure + α) from the subordinate fluid pump 24 is supplied to the fluid pressure passage 18.

When the directional control valve 25 is set at position b, the higher fluid pressure (the standard fluid pressure + α) is therefore supplied from the subordinate fluid pump 24 to the fluid pressure passage 18 so that the higher fluid pressure is supplied to the fluid pressure chamber 14. Since the fluid pressure chamber 13 is provided with the standard fluid pressure from the main gallery via the fluid pressure passage 17 at this time, the stopper pin 12 with the piston portion 12a integrated therewith is caused to move rightwards against the biasing force of the return spring 15 as shown in FIGS. 3 and 7 to assume the first position. As is depicted in FIGS. 3 and 4, the stopper pin 12 is hence brought into engagement with the engagement portion 5b whereby the eccentric sleeve 5 is fixed at the maximum eccentric position on the big end of the connecting rod 6. As a result, the connecting rod 6 is brought into the apparently most-extended state to realize the state of a high compression ratio.

When the directional control valve 25 is set at position a on the other hand, the fluid pressure passage 18 is supplied with the standard fluid pressure from the main gallery 23 so that this standard fluid pressure is also supplied to the fluid pressure chamber 14. Since the fluid pressure chamber 13 has already been supplied with the standard fluid pressure from the main gallery 23 by way of the fluid pressure passage 17, the stopper pin 12 with the piston portion 12a integrated therewith is caused to move leftwards under the biasing force of the return spring 15 as shown in FIGS. 2 and 6. Consequently, as is depicted in FIGS. 1 and 2, the stopper pin 12 is brought into engagement with the engagement portion 5a so that the eccentric sleeve 5 is fixed at the minimum eccentric position on the big end of the connecting rod 6. As a result, the connecting rod 6 is brought into the apparently most-contracted state so that the state of a low compression ratio can be realized.

Incidentally, the fluid pump 19 and the subordinate fluid pump 24 are both driven by an engine.

Designated at numeral 26 in FIG. 8 is a relief valve. This relief valve 26 serves to maintain constant the pressure difference α between (the standard fluid pressure + α) and the standard fluid pressure.

Numeral 27 indicates a fluid control valve for the directional control of the directional control valve 25. When the fluid control valve 27 is set at position a, the pilot fluid pressure for the directional control valve 25 is lowered so that the directional control valve 25 can be set at position a. When the oil control valve 27 is set at position b, the pilot fluid pressure for the directional control valve 25 is raised so that the directional control valve 25 can be set at position b.

The fluid control valve 27 is inputted with a directional control signal from a controller 40. The controller 40 outputs such a control signal as to set the fluid control valve 27 at position a when the controller 40 detects a high engine load range higher than a medium engine load range or a high engine speed range upon receipt of detection signals from an engine load sensor 41 and an engine speed (revolution number) sensor 42. Upon detection of an engine load range equal to or lower than the medium engine load range, the controller 40 however outputs such a control signal as to set the fluid control valve 27 at position b.

Owing to the above construction, upon detection of a range equal to or lower than the medium engine load range, a control signal is outputted such that the fluid control valve 27 is set at position b. Accordingly, the directional control valve 25 is also set at position b so that the higher fluid pressure (the standard fluid pressure + $\alpha$) from the fluid pump 24 is supplied to the fluid pressure passage 18 and this higher fluid is hence supplied to the fluid pressure chamber 14. Since the fluid pressure chamber 13 has already been supplied with the standard fluid pressure from the main galley 23 through the fluid pressure passage 17 at this time, the pressure difference $\alpha$ between the higher fluid pressure (the standard fluid pressure + $\alpha$) and the standard fluid pressure is applied to the piston portion 12a as a result. This pressure difference $\alpha$ then causes the stopper pin 12, which has the piston portion 12a integrated therewith, to move rightwards against the biasing force of the return spring 15 as shown in FIGS. 3 and 7. As a result, the stopper pin 12 assumes the first position and, as depicted in FIGS. 3 and 4, the stopper pin 12 is brought into engagement with the engagement portion 5b so that the eccentric sleeve 5 is fixed at the maximum eccentric position on the big end of the connecting rod 6. Hence, the connecting rod 6 is brought into the apparently most-extended state whereby the state of a high compression ratio is realized. Conversion into such a high compression ratio state improves the thermal efficiency, whereby improvements in the fuel cost and the like can be expected.

Upon detection of a range higher than the medium engine load range or a high engine speed range, a control signal is outputted such that the fluid control valve 27 is set at position a. Accordingly, the directional control valve 25 is also set at position a so that the standard fluid pressure from the main gallery 23 is supplied to both the fluid pressure passages 17 and 18 and the fluid pressure chambers 13,14 are supplied with the standard fluid pressure. By the biasing force of the return spring 15, the stopper pin 12 having the piston portion 12a integrated therewith is hence caused to move leftwards as shown in FIGS. 2 and 6. As a result, the stopper pin 12 assumes the second position and, as depicted in FIGS. 1 and 2, the stopper pin 12 is brought into engagement with the engagement portion 5a so that the eccentric sleeve 5 is fixed at the minimum eccentric position on the big end of the connecting rod 6. As a result, the connecting rod 6 is brought into the apparently most-contracted state whereby the state of a high compression ratio is realized. Conversion into such a low compression ratio state makes it possible to avoid knocking without failure.

Since the fluid pressure chambers 13,14 are both applied with the working fluid of the standard fluid pressure as a base fluid pressure in the first embodiment as described above, the pressure difference between the fluid pressure chambers is not changed by variations in engine speed or crank angle so that the operation of the stopper pin 12 is not rendered unsure by centrifugal force, acceleration of reciprocal motion of the connecting rod 6 and/or the like.

Further, the stopper pin 12 is designed movable in the direction of the axis of the crankshaft 1. The stopper pin 12 can therefore be actuated without failure even if it is affected by inertia force developed, for example, based on reciprocal motion of the connecting rod.

In addition, the eccentric sleeve 5 can be fixed at the maximum eccentric position on the big end of the connecting rod 6 when the stopper pin 12 assumes the first position, and when the stopper pin 12 moves in the opposite direction and takes the second position, the eccentric sleeve 5 can be fixed at the minimum eccentric position on the big end of the connecting rod 6. It is therefore no longer required to take into consideration the timing of drive for the stopper pin 12, whereby the control for the modification of the compression ratio can be simplified. In contrast, the apparatus disclosed in Japanese Patent Publication No. 32972/1988 requires to control of the timing of projection of the lock pin by detecting the position of the piston. This control is more complex than that performed by the above-described apparatus of the first embodiment of this invention.

The control fluid pressure for the fluid pressure chambers 13,14 are supplied via the course of the cylinder block journal→the crankpin 2 of the crankshaft 1→the connecting rod 6 as described above, so that the control fluid pressure substantially fluctuates under the influence of centrifugal force from the crankshaft and centrifugal force from the connecting rod.

Figure 26:
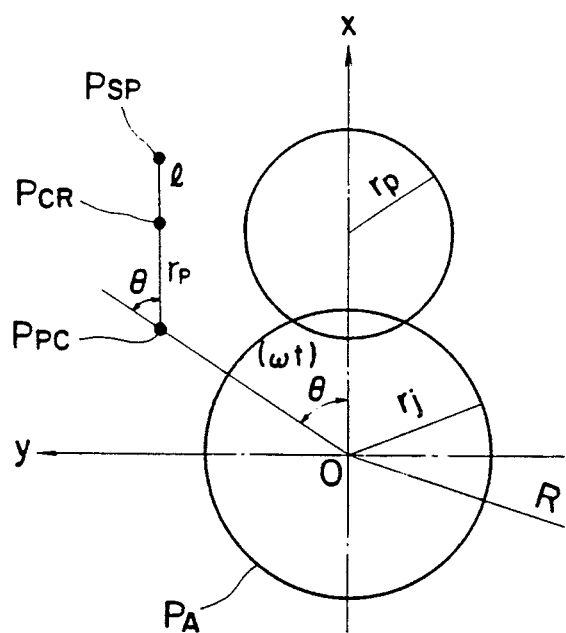
FIG. 26 diagrammatically illustrates the dimensions of various portions of a crankshaft.

Representing the angular velocity of the crankshaft by $\omega$, the radius of the crankshaft by R, the radius of the crankjournal by rj, the radius of the crankpin by rp, the line length from the center of the crankpin to the center of stopper pin by l and the fluid pressure at the journal by $P_A$ as shown in FIG. 26, the fluid pressure $P_{PC}$ at the center of the crankpin at the angular velocity $\omega$ can be expressed by the following formula:

$$P_{PC} = P_A + (1/A)\int \Delta mr\omega^2 \qquad (1)$$
$$= P_A + (1/2)\rho\omega^2(R^2 - rj^2)$$

wherein

A: cross-sectional area of the line,
$\Delta m$: mass of the hydraulic fluid over a small distance, and
$\rho$: density of the hydraulic fluid.

Further, the fluid pressure $P_{CR}$ supplied to the connecting rod can be represented by the following formula:

$$P_{CR} = P_{PC} + (1/A)\int \Delta mr\omega^2 \qquad (2)$$
$$= P_A + (1/2)\rho\omega^2(R^2 - rj^2) + \rho\omega^2 \cdot R \cdot rp \cdot \cos \omega t$$

Similarly, the fluid pressure $P_{SP}$ at the stopper pin in the connecting rod can be given by the following formula:

$$P_{SP} = P_A + (1/2)\rho\omega^2(R^2 - rj^2) + \rho\omega^2 R(rp + l)\cos \omega t \qquad (3)$$
$$= P_A + \rho\omega^2\{(1/2)(R^2 - rj^2) + R(rp + l)\cos \omega t\}$$

Using $P_B$ and $P_C$ which are defined as follows:

$$P_B = (\tfrac{1}{2})\rho\omega^2(R^2 - rj^2) \quad (4)$$

$$P_C = \rho\omega^2 R(rp + l)\cos \omega t \quad (5)$$

the formula (3) can be simplified as follows:

$$P_{SP} = P_A + P_B + P_C.$$

Figure 27:
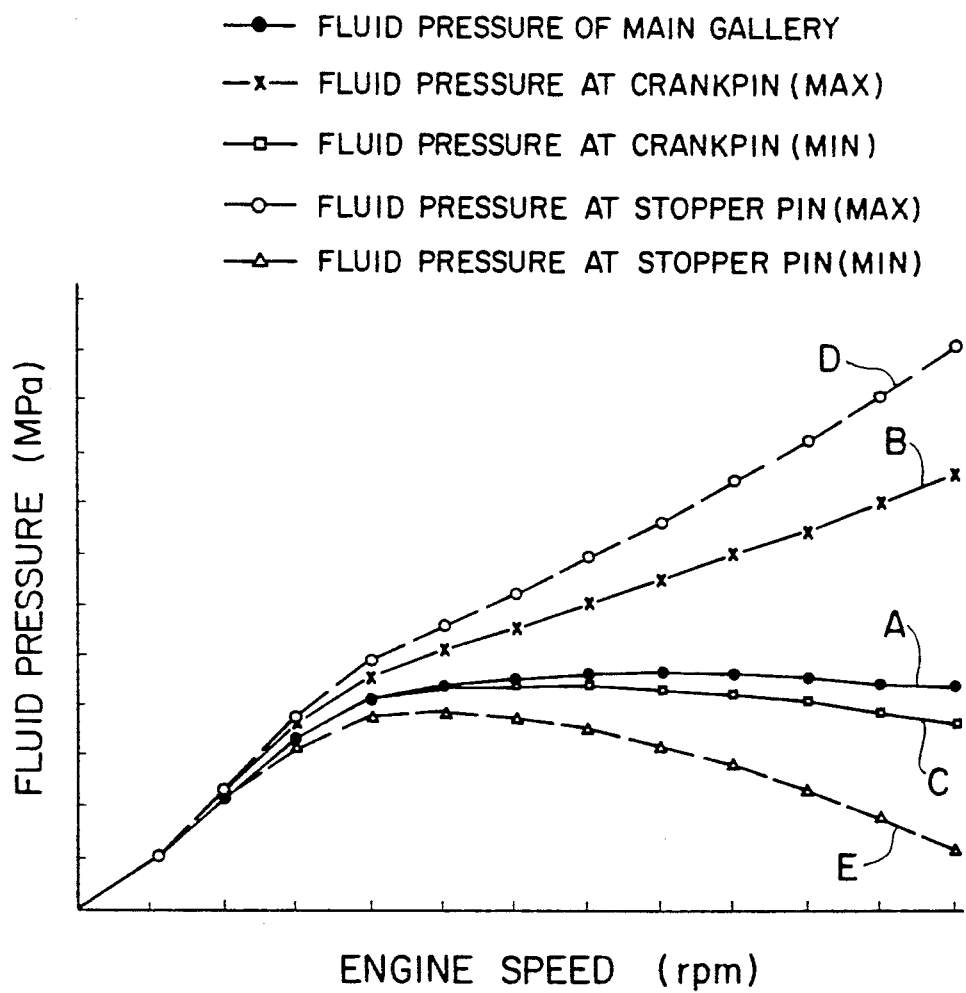
FIG. 27 is a characteristic diagram of fluid pressure applied to a fluid pressure drive system and its fluid pressure supply system.

Since $P_A$ is a function of the speed of the engine and the viscosity coefficient of the hydraulic fluid and $P_B$ is a function of the speed of the engine and the phase of the crankshaft, the control fluid pressure at the stopper pin built in the connecting rod 6 substantially fluctuates as diagrammatically shown in FIG. 27, in which the fluid pressure $P_{CR}$ supplied to the connecting rod corresponds to the fluid pressures (max, min) at the crankpin (characteristic curves B and C) and the fluid pressure $P_{SP}$ at the stopper pin in the connecting rod corresponds to the fluid pressure (max, min) at the stopper pin (characteristic curves D and E).

When the pressure difference $\alpha$ is designed to act between both the fluid pressure chambers 13 and 14 as in the present embodiment, pressure variations caused by centrifugal force from the crankshaft and/or that from the connecting rod can be canceled out thereby making it possible to establish a fluid pressure supply system which is not affected by the speed of the engine and/or the phase of the crankshaft.

The second embodiment will next be described with reference to FIGS. 9-13.

Figure 9:
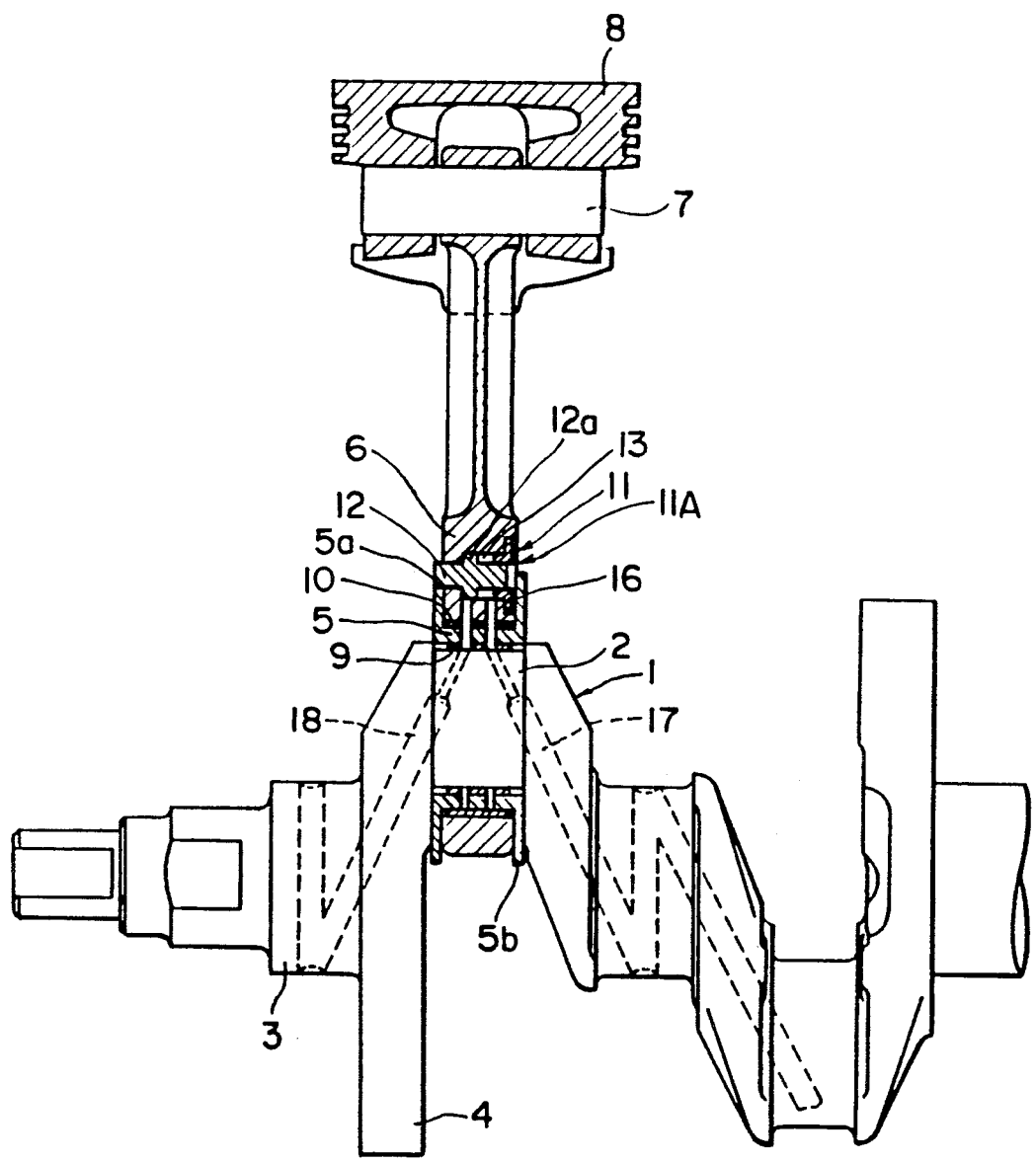
Figure 10:
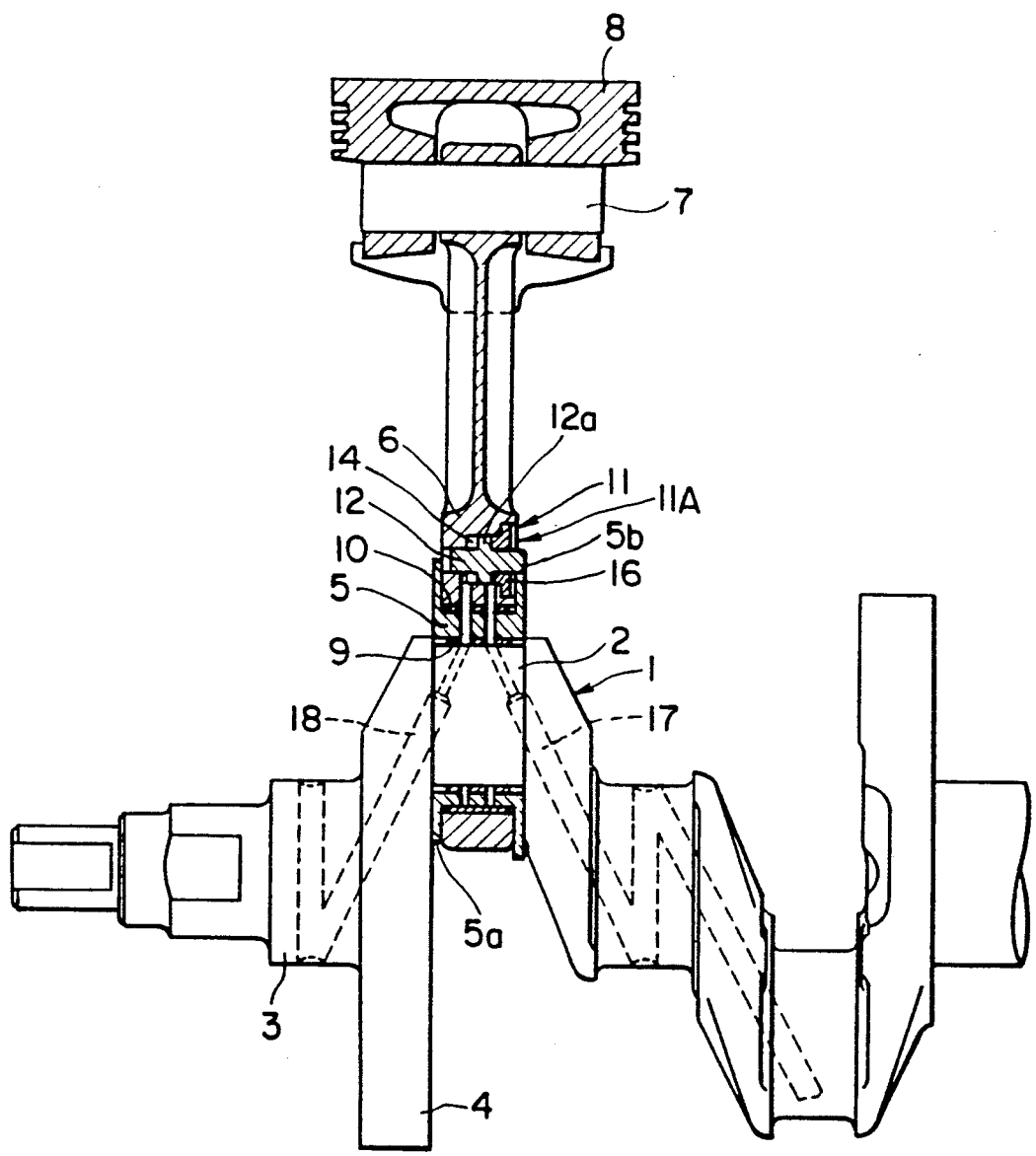

In the second embodiment, as is shown in FIGS. 9 and 10, the eccentric sleeve 5 which makes the bearing hole of the connecting rod 6 and the crankpin 2 eccentric relative to each other, said crankpin 2 extending as a shaft through the bearing hole, is also provided rotatably in the pivot portion of the big end of the connecting rod 6 such that the eccentric sleeve 5 is allowed to take either the maximum eccentric position or the minimum eccentric position.

Further, the eccentric sleeve lock means 11 is also provided. This eccentric sleeve lock means 11 can also fix rotation of the eccentric sleeve 5 at either one of two positions (i.e., the maximum eccentric position and minimum eccentric position described above) by actuating the stopper pin 12 as the pin member, said stopper pin 12 being movable in the direction of the axis of the eccentric sleeve 5, i.e., in the direction of the crankshaft 1, via the fluid pressure drive system 11A as a piston-type fluid pressure drive system therefor such that the stopper pin 12 is brought into engagement with either one of the two engagement portions 5a,bb formed on the eccentric sleeve 5.

Figure 11:
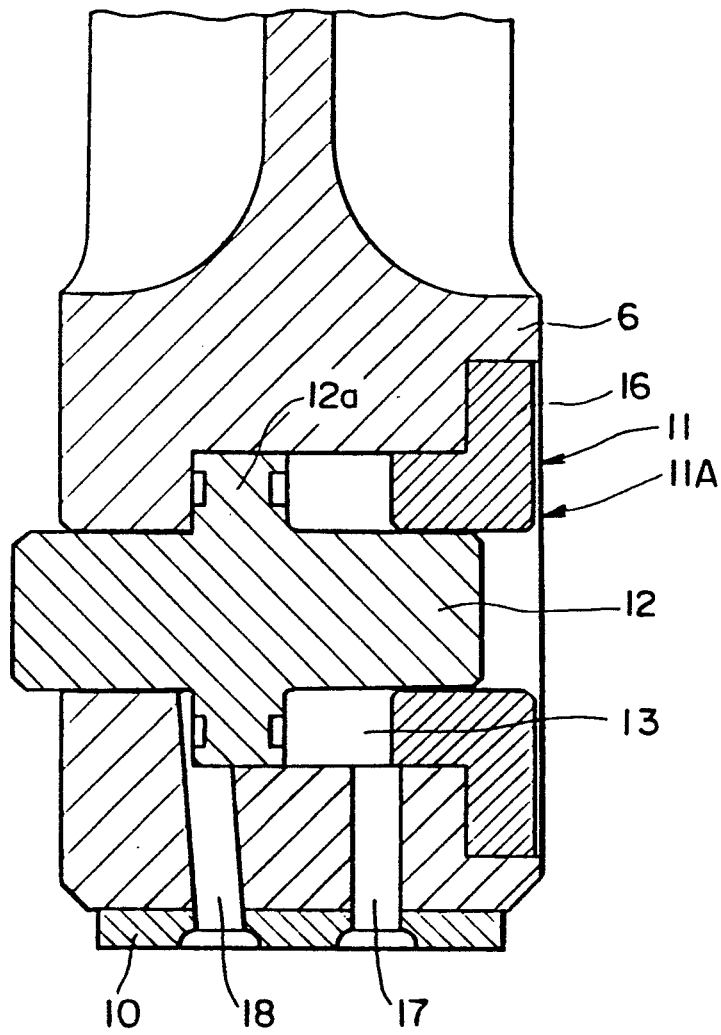
Figure 12:
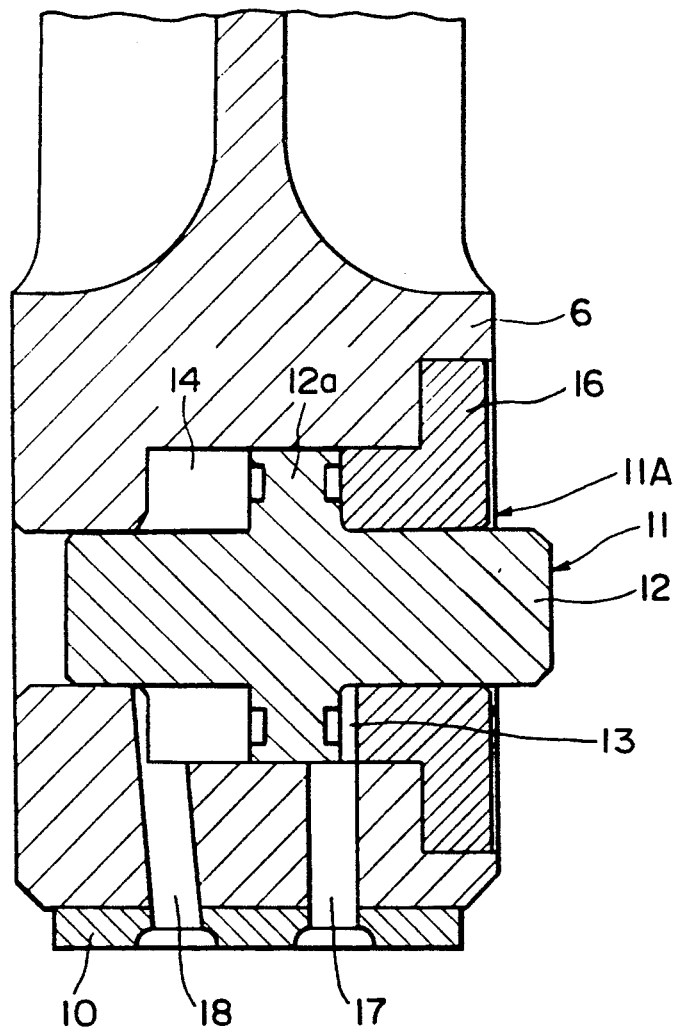

The eccentric sleeve 5 also has the flange portions in this embodiment, which flange portions are axially spaced from each other with the big end of the connecting rod 6 being flanked by the flange portions. At a position of one of the flange portions where the eccentric sleeve 5 takes the minimum eccentric position, the engagement portion 5a in the form of a notch is formed. At a position of the other flange portion where the eccentric sleeve 5 assumes the maximum eccentric position, another engagement portion 5b in the form of a notch is formed. When the stopper pin 12 has moved rightwards and has taken the first position as shown in FIGS. 10 and 12, the stopper pin 12 engages the engagement portion 5b and the eccentric sleeve 5 is fixed at the maximum eccentric position on the big end of the connecting rod 6 as illustrated in FIG. 10. When the stopper pin 12 has moved leftwards and has taken the second position as depicted in FIGS. 9 and 11, the stopper pin 12 engages the engagement portion 5a and the eccentric sleeve 5 is fixed at the minimum eccentric position on the big end of the connecting rod 6 as shown in FIG. 9. When the eccentric sleeve 5 is fixed at the maximum eccentric position on the big end of the connecting rod 6, the connecting rod 6 is brought into a state apparently most extended so that a high compression ratio state can be realized. When the eccentric sleeve 5 is fixed at the minimum eccentric position thereof on the big end of the connecting rod 6, the connecting rod 6 takes a state apparently most contracted so that a low compression ratio state can be realized.

The second embodiment is different from the above-described first embodiment in the structure of the eccentric sleeve lock means.

The second embodiment is the same as the first embodiment in that the medium-diameter portion of the through-hole formed in the big end of the connecting rod 6 is divided by the piston portion 12a into the two chambers 13,14 as the fluid pressure chambers by fitting the stopper pin 12, which is provided with the piston portion 12a, in the through-hole and fixing the cap 16 on the connecting rod 6 with bolts or the like and the fluid pressure passages 17,18 are connected to the respective chambers 13,14. However, the return spring is arranged in neither the fluid pressure chamber 13 nor the fluid pressure chamber 14 in the second embodiment.

Instead, fluid pressures are applied to the fluid pressure chambers 13,14, respectively such that a pressure difference $\alpha'$ ($\alpha' < \alpha$) is produced between the fluid pressure chambers 13 and 14 and a prescribed fluid pressure (the standard fluid pressure) exists even on the low pressure side, and a means is provided to permit switching between a state in which the fluid pressure of one of the fluid pressure chambers, e.g., the fluid pressure chamber 13 is higher and another state in which the fluid pressure of the other fluid pressure chamber 14 is higher.

This means will be described in further detail.

Figure 13:
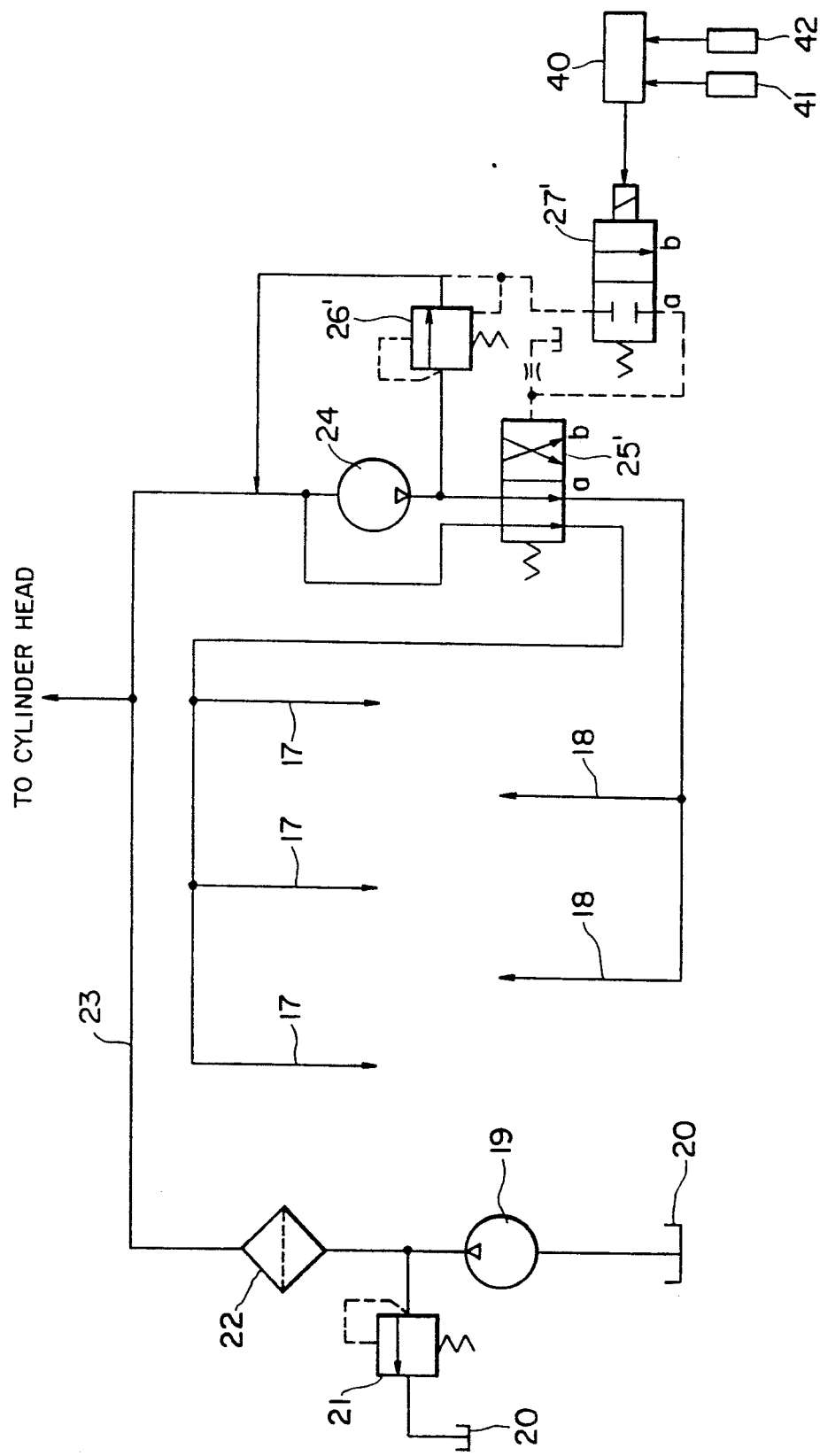

Namely, the fluid pressure passages 17,18 successively extend, as shown in FIGS. 9 and 10, through the crankjournal 3 of the crankshaft 1, the crankarm 4, the crankpin 2, the metal bearing 9, the eccentric sleeve 5, the metal bearing 10 and the big end of the connecting rod 6, and are connected to the fluid pressure chambers 13,14, respectively. As is illustrated in FIG. 13, the fluid pressure passages 17,18 outside the crankshaft are connected to the side of the subordinate fluid pump 24 or the main gallery 23. Namely, the hydraulic fluid (e.g., a lubricating oil) from the fluid pan 20 is supplied as a hydraulic fluid of a desired fluid pressure (the standard fluid pressure) by the fluid pump 19, which is provided with the relief valve 21, to the main gallery 23 via the fluid filter 22. The hydraulic fluid from the main gallery 23 is supplied to the subordinate fluid pump 24 and is then discharged with a still higher fluid pressure (the standard fluid pressure + $\alpha'$). It is to be noted that either the fluid pressure from the subordinate fluid pump 24 or the fluid pressure from the main gallery 23 is selectively supplied to the fluid pressure passages 17,18 by way of a directional control valve 25'. Namely, when the directional control valve 25' is set at position a as shown in FIG. 13, the standard fluid pressure is supplied from the main gallery 23 to the fluid pressure passage 17 and the higher fluid pressure (the standard fluid pressure + $\alpha'$) from the subordinate fluid pump 24 is supplied to the fluid pressure passage 18. When the directional control valve 25' is set at position b, the standard fluid pressure from the main gallery 23 is supplied to the fluid pressure passage 18 and the higher fluid pressure (the standard fluid pressure+α') from the subordinate fluid pump 24 is supplied to the fluid pressure passage 17. Accordingly, the pressure difference α' always exists between the fluid pressure chambers 13 and 14.

When the directional control valve 25' is set at position a, the standard fluid pressure from the main gallery 23 is therefore supplied to the fluid pressure passage 17 while the higher fluid pressure (the standard fluid pressure+α') from the subordinate fluid pump 24 is supplied to the fluid pressure passage 18, whereby the fluid pressure chamber 14 is supplied with the standard fluid pressure while the fluid pressure chamber 14 is supplied with the higher fluid pressure (the standard fluid pressure+α'). The stopper pin 12 with the piston portion 12a integrated therewith is therefore caused to move rightwards as shown in FIGS. 10 and 12 to assume the first position. As is depicted in FIG. 10, the stopper pin 12 is hence brought into engagement with the engagement portion 5b whereby the eccentric sleeve 5 is fixed at the maximum eccentric position on the big end of the connecting rod 6. As a result, the connecting rod 6 is brought into the apparently most-extended state to realize the state of a high compression ratio.

When the directional control valve 25' is set at position b on the other hand, the fluid pressure passage 18 is supplied with the standard fluid pressure from the main gallery 23 while the fluid pressure passage 17 is supplied with the higher fluid pressure (the standard pressure+α'), so that the stopper pin 12 with the piston portion 12a integrated therewith is caused to move leftwards as shown in FIGS. 9 and 11. Consequently, as is depicted in FIG. 9, the stopper pin 12 is brought into engagement with the engagement portion 5a so that the eccentric sleeve 5 is fixed at the minimum eccentric position on the big end of the connecting rod 6. As a result, the connecting rod 6 is brought into the apparently most-contracted state so that the state of a low compression ratio can be realized.

It is to be noted that the pressure-receiving areas on both sides of the piston portion 12a are set equal to each other and the sliding friction of the piston portion 12a is negligibly small.

Designated at numeral 26' in FIG. 13 is a relief valve. This relief valve 26' serves to maintain constant the pressure difference α' between (the standard fluid pressure+α') and the standard fluid pressure.

Numeral 27' indicates a fluid control valve for the directional control of the directional control valve 25'. When the fluid control valve 27' is set at position a, the pilot fluid pressure for the directional control valve 25' is lowered so that the directional When the oil control valve 27' is set at position b, the pilot fluid pressure for the directional control valve 25' is raised so that the directional control valve 25' can be set at position b.

The fluid control valve 27' is inputted with a directional control signal from the controller 40. The controller 40 outputs such a control signal as to set the fluid control valve 27' at position b when the controller 40 detects a high engine load range higher than the medium engine load range or the high engine speed range upon receipt of detection signals from the engine load sensor 41 and the engine speed sensor 42. Upon detection of an engine load range equal to or lower than the medium engine load range, the controller 40 however outputs such a control signal as to set the fluid control valve 27' at position a.

Owing to the above construction, upon detection of a range equal to or lower than the medium engine load range, a control signal is outputted such that the fluid control valve 27' is set at position a. Accordingly, the directional control valve 25' is also set at position a so that the standard fluid pressure from the main gallery 23 is supplied to the fluid pressure passage 17 and the higher fluid pressure (the standard fluid pressure+α') from the subordinate fluid pump 24 is supplied to the fluid pressure passage 18, leading to a state in which the fluid pressure is higher in the fluid pressure chamber 14. As a result, the pressure difference α' between the higher fluid pressure (the standard fluid pressure+α ) and the standard fluid pressure is applied to the stopper pin 12 so that the stopper pin with the piston portion 12a integrated therewith is caused to move rightwards as shown in FIGS. 10 and 12 and the stopper pin 12 assumes the first position. As a result, as is illustrated in FIG. 10, the stopper pin 12 is brought into engagement with the engagement portion 5b so that the eccentric sleeve 5 is fixed at the maximum eccentric position on the big end of the connecting rod 6. Hence, the connecting rod 6 is brought into the apparently most-extended state whereby the state of a high compression ratio is realized. Conversion into such a high compression ratio state improves the thermal efficiency, whereby improvements in the fuel cost and the like can be expected.

Upon detection of a range higher than the medium engine load range or the high engine speed range, a control signal is outputted such that the fluid control valve 27' is set at position b. Accordingly, the directional control valve 25' is also set at position b so that the standard fluid pressure from the main gallery 23 is supplied to the fluid pressure passage 18 and the higher fluid pressure (the standard fluid pressure+α ) from the subordinate fluid pump 24 is supplied to the fluid pressure passage 17, leading to an opposite state that the fluid pressure in the fluid pressure chamber 13 is higher this time. The stopper pin 12 having the piston portion 12a integrated therewith is hence caused to move leftwards as shown in FIGS. 9 and 11 so that the stopper pin 12 assumes the second position. As a result, as is depicted in FIG. 9, the stopper pin 12 is brought into engagement with the engagement portion 5a so that the eccentric sleeve 5 is fixed at the minimum eccentric position on the big end of the connecting rod 6. As a result, the connecting rod 6 is brought into the apparently most-contracted state whereby the state of a low compression ratio is realized. Conversion into such a low compression ratio state makes it possible to avoid knocking without failure.

In the second embodiment, as has been described above, fluid pressures are applied to the fluid pressure chambers 13,14, respectively such that the pressure difference α' (α'<α) is produced between the fluid pressure chambers 13 and 14 and the prescribed fluid pressure (the standard fluid pressure) exists even on the low pressure side, and there is also provided the means for permitting switching between the state in which the fluid pressure of one of the fluid pressure chambers, e.g., the fluid pressure chamber 13 is higher (the standard fluid pressure+α') and the state in which the fluid pressure of the other fluid pressure chamber 14 is higher (the standard fluid pressure+α'). The pressure difference between both the fluid pressure chambers is therefore not changed by variations in engine speed or crank angle so that the operation of the stopper pin 12 is not rendered unsure by centrifugal force, acceleration of reciprocal motion of the connecting rod 6 and/or the like. Since the pressure difference $\alpha'$ between both the fluid pressure chambers 13 and 14 may be smaller compared with the pressure difference $\alpha$ in the above-described first embodiment, said pressure difference $\alpha$ being required to be large enough to overcome the biasing force of the return spring 15, (theoretically, may be any desired positive value), the stopper pin 12 can be driven without failure even when the delivery ability of the subordinate fluid pump 24 is low as in a state such that the engine speed is low.

Further, the stopper pin 12 is designed movable in the direction of the axis of the crankshaft 1. The stopper pin 12 can therefore be actuated without failure even if it is affected by inertia force developed, for example, based on reciprocal motion of the connecting rod.

In addition, the eccentric sleeve 5 can be fixed at the maximum eccentric position on the big end of the connecting rod 6 when the stopper pin 12 assumes the first position, and when the stopper pin 12 moves in the opposite direction and take the second position, the eccentric sleeve 5 can be fixed at the minimum eccentric position on the big end of the connecting rod 6. It is therefore no longer required to take into consideration the timing of drive for the stopper pin 12, whereby the control for the modification of the compression ratio can be simplified.

The third embodiment will next be described with reference to FIGS. 14 and 15.

In this third embodiment, as is shown in FIG. 14, an eccentric sleeve 28 for making the bearing hole of the connecting rod 6 and the piston pin 7, which extends as a shaft through the bearing hole, eccentric relative to each other is rotatably provided in a pivot portion of a small end of the connecting rod 6 such that the eccentric sleeve 28 can assume either a maximum eccentric position or a minimum eccentric position.

An eccentric sleeve lock means 29 is also provided. This eccentric sleeve lock means 29 can actuate a stopper pin 30 as a pin member, said stopper 30 being movable in a direction perpendicular to the direction of an axis of the eccentric sleeve 28, by means of a fluid pressure drive system 35 as a piston-type fluid pressure drive system, whereby the stopper pin 30 can be brought into engagement with one of two engagement portions 28a,28b formed in the eccentric sleeve 28 to fix rotation of the eccentric sleeve 28 at either one of two positions (i.e., the maximum eccentric position and minimum eccentric position described above).

The eccentric sleeve 28 defines the engagement portion 28a as a notch in an outer peripheral portion thereof at the position that the eccentric sleeve 28 takes the minimum eccentric position and also the engagement portion 28b as a notch in the outer peripheral portion thereof at the position that the eccentric sleeve 28 assumes the maximum eccentric position. When the stopper pin 30 is caused to project, the stopper pin 30 is allowed to engage either the engagement portion 28a or the engagement portion 28b.

Which one of the engagement portions 28a and 28b the stopper pin 30 should be brought into engagement with is effected by such a means as will be described below. Namely, as is disclosed in Japanese Patent Publication No. 32972/1988, the position of the crankshaft, as a consequence, the position of the piston is detected by counting the number of teeth of a ring gear, which rotates together with the crankshaft 1, by an electromagnetic pickup and the timing of projection for the stopper pin is controlled by the position of the piston so as to determine with which one of the engagement portions 28a and 28b the stopper pin should be brought into engagement.

When the eccentric sleeve 28 is fixed at the maximum or minimum eccentric position on the small end of the connecting rod 6, the connecting rod 6 is brought into a state apparently most extended or contracted so that a high or low compression ratio state can be realized.

The stopper pin 30 has at an intermediate portion thereof a piston portion 30a formed integrally therewith. The pressure-receiving areas on both sides of the piston portion 30 are set equal to each other. The stopper pin 30 with the piston portion 30a integrated therewith is inserted in a recess which is open in an inner peripheral wall of the bearing hole formed in the small end of the connecting rod 6 and has substantially the same diameter as the piston portion 30a throughhole formed in the big end of the connecting rod 6. A return spring 33 is then inserted, followed by the fitting of cap 34, whereby fluid pressure chambers 31,32 are formed on opposite sides of the piston portion 30a. The fluid pressure passages 17,18 are connected to these fluid pressure chambers 31,32, respectively. These fluid pressure passages 17,18 successively extend, as shown in FIG. 14, through the connecting rod 6, the metal bearing 9 and the crankshaft 1 and, outside the crankshaft 1, are connected to such a hydraulic circuit system as shown in FIG. 8.

Also provided are a means for applying a prescribed fluid pressure (a standard fluid pressure) in advance to both the fluid pressure chambers 31,32 through their corresponding fluid pressure passages 17,18 and another means for applying a fluid pressure (the standard fluid pressure $+\alpha$) higher than the standard fluid pressure to the fluid pressure chamber 32 so as to cause the stopper pin with the piston portion 30a integrated therewith to move against the biasing force of the return spring 33 toward the fluid pressure chamber 31. Upon application of the higher fluid pressure to the fluid pressure chamber 32, the stopper pin 30 is caused to project so that the stopper pin 30 is brought into engagement with either the engagement portion 28a or the engagement portion 28b.

In addition, the fluid control valve 27 shown in FIG. 8 is inputted with a directional control signal from the controller 40. Different from the first embodiment described above, the controller 40 receives detection signals from the engine load sensor 41, the engine speed sensor 42 and the unillustrated electromagnetic pickup (piston position sensor) and, upon locking, outputs a control signal such that the fluid control valve can be set at position b but, upon changing the engagement portion maintained in engagement with the stopper pin 30, outputs another control signal such that the fluid control valve 27 can be set at position a. Incidentally, the timing of output of each control signal is determined on the basis of a signal from the piston position sensor.

Owing to the above construction, upon detection of a range equal to or lower than the medium engine load range, a control signal is outputted such that the fluid control valve 27 is set at position a to set the directional control valve at position a. Then, the standard fluid pressure from the main gallery 23 is supplied to both the fluid pressure passages 17,18 and the fluid pressure chambers 13,14 are both supplied with the standard fluid pressure. As a result, by the biasing force of the return spring 33, the stopper pin 30 with the piston portion 30a integrated therewith is caused to retreat so that the engagement of the stopper pin 30 with the engagement portion is released. After the locked state has been released as described above, a control signal is outputted at a prescribed timing such that the fluid control valve 27 is set at position b. This results in the setting of the directional control valve 25 at position b, whereby the higher fluid pressure from the fluid pump 24 is supplied to the fluid pressure passage 18 and the fluid pressure chamber 32 is accordingly supplied with this higher fluid pressure (the standard fluid pressure+$\alpha$). Since the fluid pressure chamber 31 has already been supplied with the standard fluid pressure from the main galley 23 through the fluid pressure passage 17 at this time, the pressure difference $\alpha$ between the higher fluid pressure (the standard fluid pressure+$\alpha$) and the standard fluid pressure is applied to the piston portion 30a as a result. This pressure difference $\alpha$ then causes the stopper pin 30, which has the piston portion 30a integrated therewith, to project against the biasing force of the return spring 33. In relation to the timing of the output of the above control signal, the stopper pin 30 so projected is brought into engagement with the engagement portion 28b so that the eccentric sleeve 28 is fixed at the maximum eccentric position on the small end of the connecting rod 6. Hence, the connecting rod 6 is brought into the apparently most-extended state whereby the state of a high compression ratio is realized. Conversion into such a high compression ratio state improves the thermal efficiency, whereby improvements in the fuel cost and the like can be expected.

Upon detection of a range higher than the medium engine load range or a high engine speed range, a control signal is first outputted such that the fluid control valve 27 is set at position a to release the engagement between the stopper pin 30 and the engagement portion, namely, to release the locked state. At another prescribed timing, another control signal is then outputted such that the fluid control valve 27 is set at position b. Accordingly, the directional control valve 25 is also set at position b so that the higher fluid pressure from the fluid pump 24 is supplied to the fluid pressure passage 18 and the fluid pressure chamber 32 is hence supplied with this higher fluid pressure (the standard fluid pressure+$\alpha$). This pressure difference $\alpha$ causes the stopper pin 30 with the piston portion 30a to project against the biasing force of the return spring 33. Accordingly, in relation to the timing of the output of the above control signal, the stopper pin 30 so projected is brought into engagement with the engagement portion 28a, whereby the eccentric sleeve 28 is fixed at the minimum eccentric position on the small end of the connecting rod 6. As a result, the connecting rod 6 is brought into the apparently most-contracted state whereby the state of a low compression ratio is realized. Conversion into such a low compression ratio state makes it possible to avoid knocking without failure.

Although the third embodiment is different from the first embodiment in that the eccentric sleeve lock means 29 is provided at the small end of the connecting rod 6 and the state of a high compression ratio and the state of a low compression ratio are selectively realized based on the projecting operation and timing for the stopper pin 30, the pressure difference between the fluid pressure chambers is not changed by variations in engine speed or crank angle owing to the application of the standard fluid pressure as a base pressure to both the fluid pressure chambers 31,32 so that the projecting and retreating operations of the stopper pin 30 are not rendered unsure by centrifugal force, acceleration of reciprocal motion of the connecting rod 6 and/or the like.

The fourth embodiment will next be described with reference to FIGS. 16 and 17.

Figure 16:
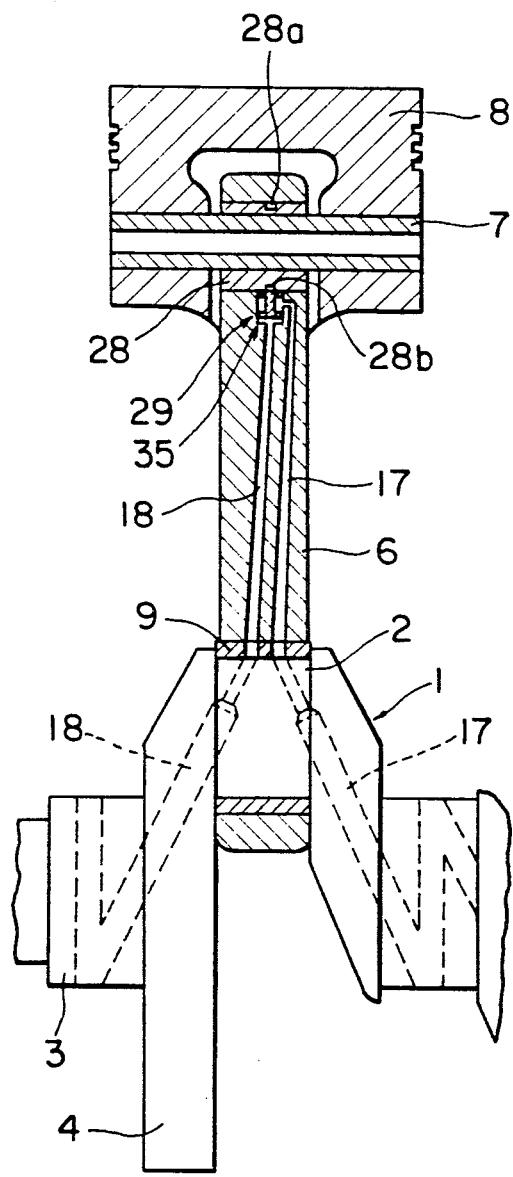
Figure 17:
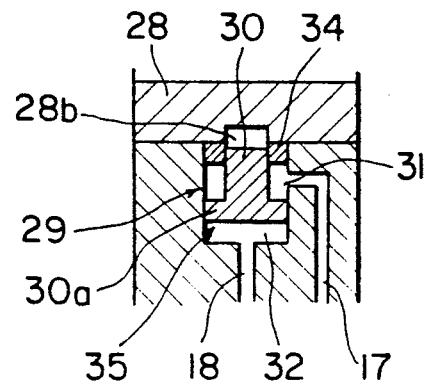

As is illustrated in FIGS. 16 and 17, this fourth embodiment is different from the third embodiment shown in FIGS. 14 and 15 in that the return spring 33 has been eliminated, fluid pressures are applied using the hydraulic circuit system (see FIG. 13) of the abovedescribed second embodiment to the fluid pressure chambers 31,32, respectively so as to produce a pressure difference $\alpha'$ ($\alpha' < \alpha$) between the fluid pressure chambers 31 and 32 while allowing a prescribed fluid pressure (the standard fluid pressure) to exist even on the low pressure side, and a state in which the fluid pressure of one of the fluid pressure chambers, e.g., the fluid pressure chamber 31 is higher (the standard fluid pressure+$\alpha'$) and the state in which the fluid pressure of the other fluid pressure chamber 32 is higher (the standard fluid pressure+$\alpha'$) can be switched over.

However, in the fourth embodiment, the controller 40 which outputs a directional control signal to the fluid control valve 27', different from &:he second embodiment described above, also receives detection signals from the engine load sensor 41, the engine speed sensor 42 and the unillustrated electromagnetic pickup (piston position sensor) and, upon locking, outputs a control signal such that the fluid control valve 27' can be set at position a but, upon changing the engagement portion maintained in engagement with the stopper pin 30, outputs another control signal such that the fluid control valve 27' can be set at position b. Incidentally, the timing of output of each control signal is determined on the basis of a signal from the piston position sensor.

Owing to the above construction, upon detection of a range equal to or lower than the medium engine load range, a control signal is outputted such that the fluid control valve 27' is set at position b. Accordingly, the directional control valve 25' is also set at position b so that the standard fluid pressure from the main gallery 23 is supplied to the fluid pressure passage 18 and the higher fluid pressure (the standard fluid pressure+$\alpha'$) from the subordinate fluid pump 24 is supplied to the fluid pressure passage 17, leading to a state in which the fluid pressure is higher in the fluid pressure chamber 31. As a result, the stopper pin 30 with the piston portion 30a integrated therewith is caused to retreat so that the engagement between the stopper pin 30 and the engagement portion is released. After the locked state has been released as described above, a control signal is outputted at a prescribed timing such that the fluid control valve 27' is set at position a. This results in the setting of the directional control valve 25' at position a, whereby the standard fluid pressure from the main gallery 23 is supplied to the fluid pressure passage 17 and the higher fluid pressure (the standard fluid pressure+$\alpha$ ) from the subordinate fluid pump 24 is supplied to the fluid pressure passage 18, leading to a state such that the fluid pressure is higher in the fluid pressure chamber 32. As a result, the pressure difference $\alpha'$ between the higher fluid pressure (the standard fluid pressure+$\alpha'$) and the standard fluid pressure is applied to the piston portion 30a. This pressure difference $\alpha'$ then causes the stopper pin 30, which has the piston portion 30a integrated therewith, to project out. As a result, in relation to the timing of the output of the above control signal, the stopper pin 30 is brought into engagement with the engagement portion 28b so that the eccentric sleeve 28 is fixed at the maximum eccentric position on the small end of the connecting rod 6. Hence, the connecting rod 6 is brought into the apparently most-extended state whereby the state of a high compression ratio is realized. Conversion into such a high compression ratio state improves the thermal efficiency, whereby improvements in the fuel cost and the like can be expected.

Upon detection of a range higher than the medium engine load range or a high engine speed range, a control signal is first outputted such that the fluid control valve 27' is set at position b to release the engagement between the stopper pin 30 and the engagement portion, namely, to release the locked state. At another prescribed timing, another control signal is then outputted such that the fluid control valve 27' is set at position a. Accordingly, the directional control valve 25' is also set at position a so that the standard fluid pressure from the main gallery 23 is supplied to the fluid pressure passage 17 and the higher fluid pressure (the standard fluid pressure+$\alpha'$) from the subordinate fluid pump 24 is supplied to the fluid pressure passage 18, leading to a state such that the fluid pressure is higher in the fluid pressure chamber 32. As a result, the pressure difference $\alpha'$ between the higher fluid pressure (the standard fluid pressure+$\alpha'$) and the standard fluid pressure is applied to the piston portion 30a, and causes the stopper pin 30 with the piston portion 30a to project out. Accordingly, in relation to the timing of the output of the above control signal, the stopper pin 30 is brought into engagement with the engagement portion 28a, whereby the eccentric sleeve 28 is fixed at the minimum eccentric position on the small end of the connecting rod 6. As a result, the connecting rod 6 is brought into the apparently most-contracted state whereby the state of a low compression ratio is realized. Conversion into such a low compression ratio state makes it possible to avoid knocking without failure.

Similarly to the second embodiment described above, fluid pressures are applied to the fluid pressure chambers 31,32, respectively such that the pressure difference $\alpha'$ is produced between the fluid pressure chambers 31 and 32 and the prescribed fluid pressure (the standard fluid pressure) exists even on the low pressure side, and there is also provided the means for permitting switching between the state in which the fluid pressure of one of the fluid pressure chambers, e.g., the fluid pressure chamber 31 is higher (the standard fluid pressure+$\alpha'$) and the state in which the fluid pressure of the other fluid pressure chamber 32 is higher (the standard fluid pressure+$\alpha'$). The pressure difference between both the fluid pressure chambers is therefore not changed by variations in engine speed or crank angle so that the operation of the stopper pin 30 is not rendered unsure by centrifugal force, acceleration of reciprocal motion of the connecting rod 6 and/or the like. Since the pressure difference $\alpha'$ between both the fluid pressure chambers 31 and 32 may be smaller compared with the pressure difference $\alpha$ in the third embodiment described above with reference to FIGS. 14 and 15, said pressure difference $\alpha$ being required to be large enough to overcome the biasing force of the return spring 33, (theoretically, may be any desired positive value), the stopper pin 30 can be projected out without failure even when the delivery ability of the subordinate fluid pump 24 is low as in a state such that the engine speed is low.

The fifth embodiment will next be described. In the fifth embodiment, as is shown in FIGS. 18-21, the connecting rod 6 is pivoted at the small end thereof on the piston pin 7 of the piston 8, which reciprocates in the cylinder of the gasoline engine (internal combustion engine), and at the big end thereof on the crankpin 2 of the crankshaft 1.

In the pivot portion at the big end of the connecting rod 6, there is formed the bearing hole of the connecting rod 6. Also provided for rotation at the pivot portion is the eccentric sleeve 5 which makes the bearing hole and the crankpin 2, which extends as a shaft through the bearing hole, eccentric relative to each other. Namely, the center of the inner peripheral circle of the eccentric sleeve 5 and that of its outer peripheral circle are not registered, and a minimum eccentric position can be approximately taken when the outer periphery of the crankpin 2 is turned over 160° from a maximum eccentric position.

Figure 22:
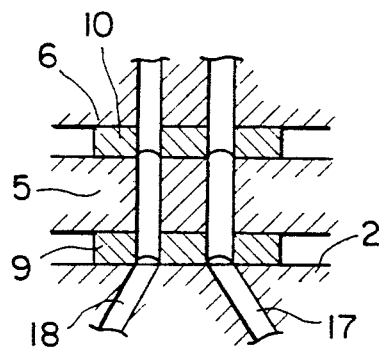

Between the inner peripheral wall of the eccentric sleeve 5 and the outer peripheral wall of the crankpin 2, the metal bearing 9 is interposed in a form attached to the inner peripheral wall of the eccentric sleeve 5 as illustrated in detail in FIG. 22. Also disposed between the outer peripheral wall of the eccentric sleeve 5 and the inner peripheral wall of the bearing hole of the connecting rod 6 is the metal bearing 10 which is attached to the inner peripheral wall of the bearing hole of the connecting rod 6. Accordingly, relative sliding movements are feasible between the eccentric sleeve 5 and the crankpin 2 and also between the eccentric sleeve 5 and the bearing hole of the connecting rod 6.

The eccentric sleeve lock means 11 is also provided. This eccentric sleeve lock means 11 is equipped with the stopper pin 12 which is movable as a pin member in the direction of the axis of the eccentric sleeve 5, in other words, in the direction of the axis of the crankshaft 1. The stopper pin 12 is actuated by the fluid pressure drive system 11A as a piston-type fluid pressure drive system for the stopper pin, whereby the stopper pin 12 is brought into engagement with either one of two engagement portions 5a,5b formed in the eccentric sleeve 5 such that rotation of the eccentric sleeve 5 can be fixed selectively at either one of the two positions (i.e., near the maximum eccentric position and the minimum eccentric position).

Figure 23:
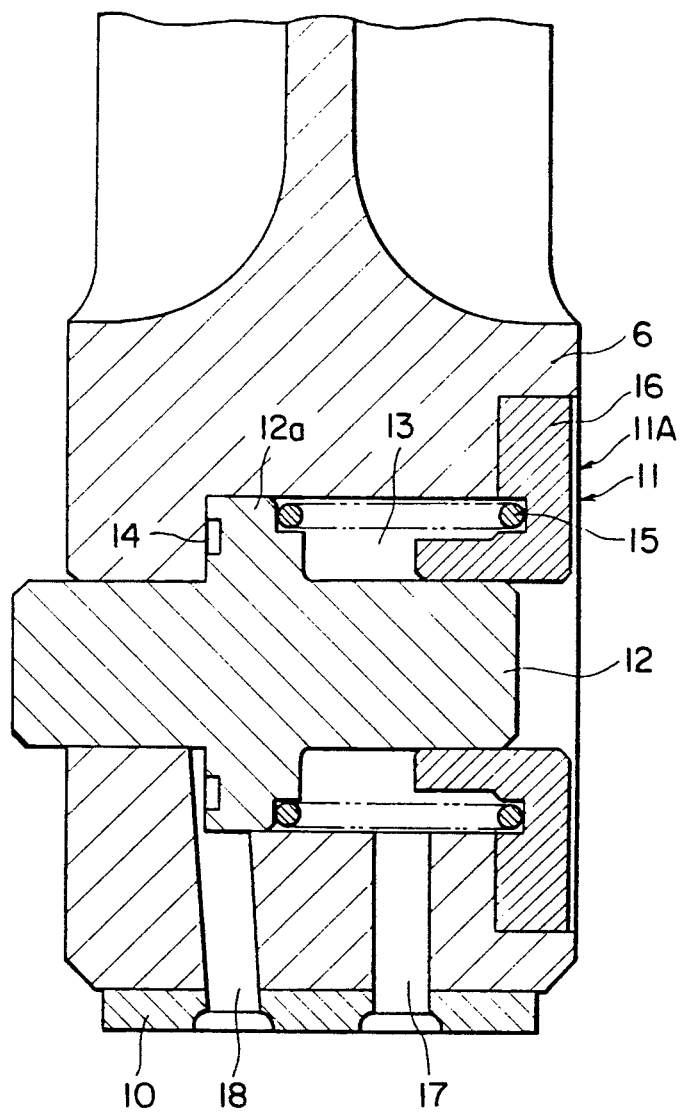
Figure 24:
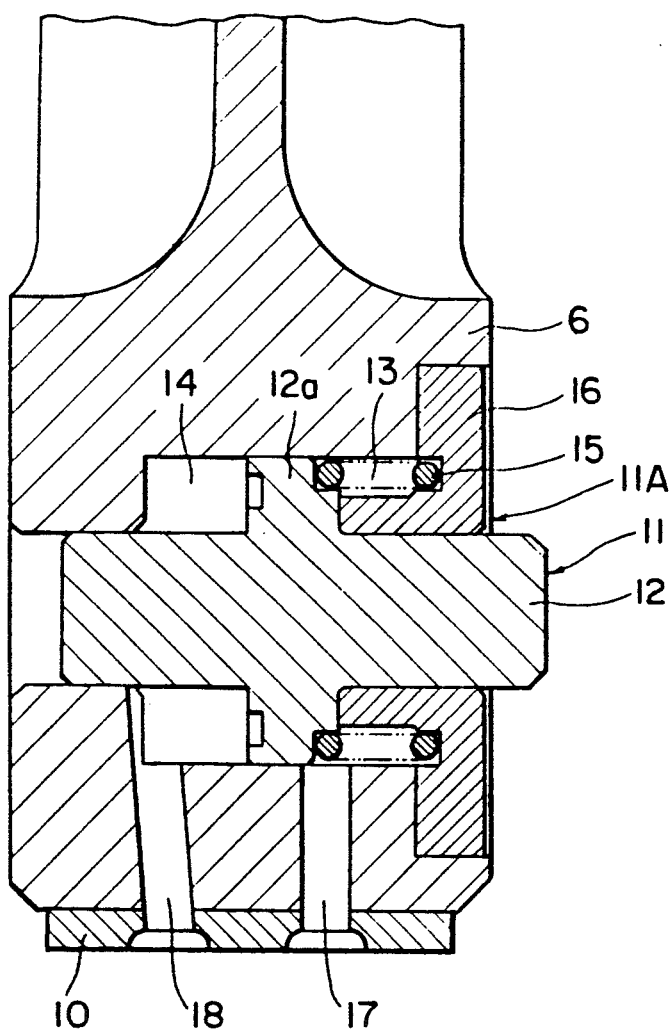

This eccentric sleeve lock means 11 will next be described in further detail. As is illustrated in FIGS. 23 and 24, the stopper pin 12 is centrally enlarged in diameter to define the piston portion 12a in the form of an integral flange. The stopper pin 12 with the piston portion 12a integrated therewith is fitted in the through-hole formed in the big end of the connecting rod 6. This through-hole extends in the direction of the axis of the crankshaft through the big end of the connecting rod 6 and is formed as a three-stage hole portion having three diameters. The small-diameter hole portion located at one end has substantially the same diameter as the stopper pin 12, the medium-diameter hole portion located at the intermediate portion has substantially the same diameter as the piston portion 12a, and the large-diameter portion located at the other end is formed with a diameter greater than that of the piston portion 12a.

Accordingly, when the stopper pin 12 with the piston portion 12a integrated therewith is inserted in the through-hole, the stopper pin 12 is placed fluid tight in the small-diameter hole portion of the through-hole and the piston portion 12a is placed fluid tight in the medium-diameter hole portion of the through-hole. After insertion of the return spring 15, the cap 16 having substantially the same diameter as the through-hole and centrally defining a through-opening of substantially the same diameter as the stopper pin 12 is fitted and the cap 16 is fixed on the connecting rod 6 by bolts or the like. The stopper pin 12 hence is fittingly inserted fluid tight at one end portion thereof in the small-diameter portion of the through-hole and at the other end portion in the through-opening of the cap 16 so that the medium-diameter diameter portion of the through-hole is divided into the two chambers 13,14 by the piston portion 12a. The fluid pressure passages 17,18 are connected to the chambers 13,14, respectively. These two chambers are therefore provided as the fluid pressure chambers 13,14 formed on the opposite sides of the piston portion 12a The return spring 15 is disposed in the fluid pressure chamber 13 to bias the stopper pin 12, which has the piston portion 12a integrated therewith, toward the fluid pressure chamber 14. It is to be noted that the pressure-receiving areas on both sides of the piston portion 12a are set equal to each other.

By the piston portion 12a integrally formed with the stopper pin 12, the fluid pressure chambers 13,14, the return spring 15, the cap 16 and the like, there is constructed the piston-type fluid pressure drive system 11A which can drive the stopper pin 12 by moving the piston portion 12a integrated with the stopper pin 12.

The eccentric sleeve 5 has flange portions 51,52 which, as shown in FIGS. 18-21, are axially spaced from each other such that the big end of the connection rod 6 is flanked by the flange portions. At a position of one of the flange portions, i.e., the flange portion 51 where the eccentric sleeve 5 takes the minimum eccentric position, the engagement portion 5a in the form of a notch is formed. At a position of the other flange portion 52 where the eccentric sleeve 5 assumes the maximum eccentric position, the other engagement portion 5b in the form of a notch is formed. Notched guide portions 53 are formed in the respective flange portions 51,52 at positions registered with each other. Further, a hydraulic cylinder 54 is provided on a lower end of the big end of the connecting rod 6. A piston 55 is fittingly inserted fluid tight within the hydraulic cylinder 54, and pins 56 are also provided, projecting out from opposite side walls of the piston 55 through windows 57 formed in opposite side walls of the hydraulic cylinder 54. Between end walls of the piston 55 and their corresponding end walls of the hydraulic cylinder 54, biasing springs 58,59 are disposed, respectively and a hydraulic fluid such as an oil is filled there. The inside of the hydraulic cylinder 54 is therefore divided by the piston 55 into compartments. These compartments are connected to a fluid supply line via orifice passages 60,61, respectively. The piston 55 is normally retained at a neutral position under the biasing forces of the biasing springs 58,59.

Figure 19:
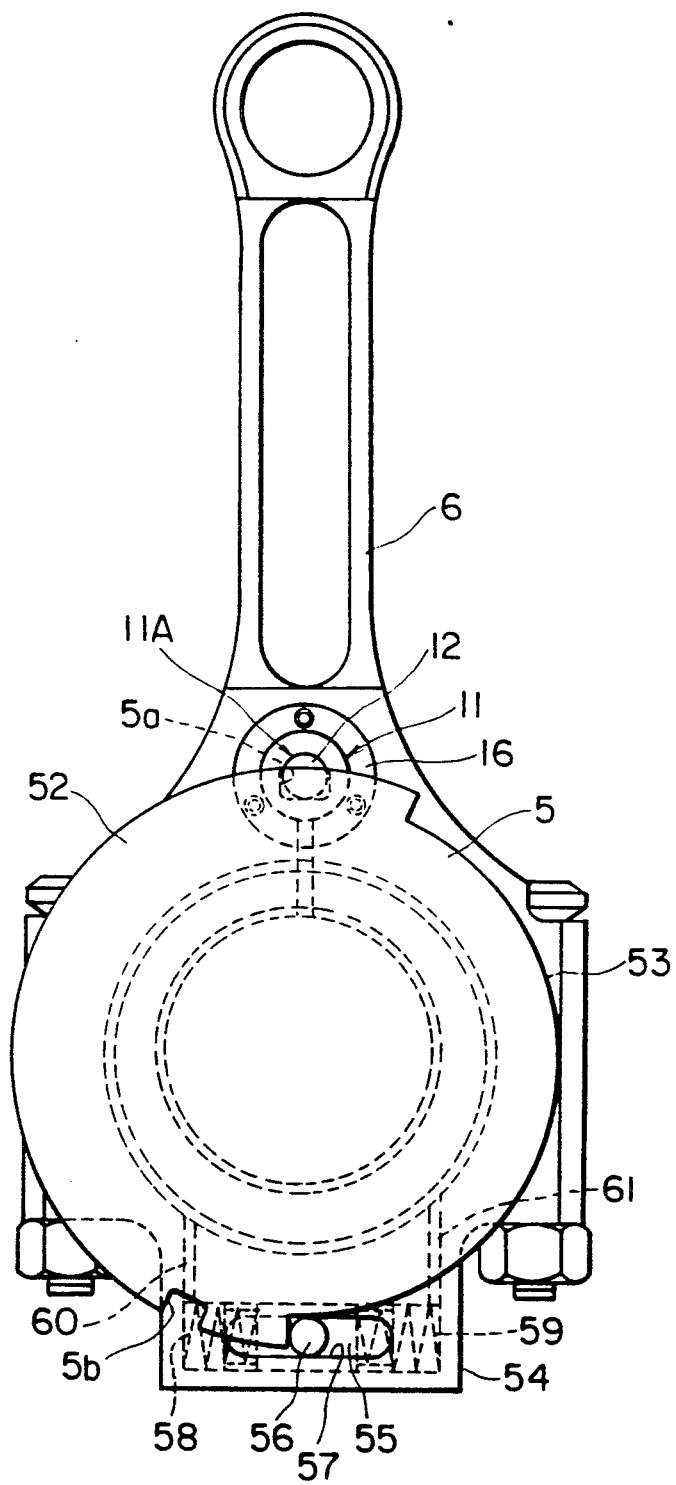
Figure 20:
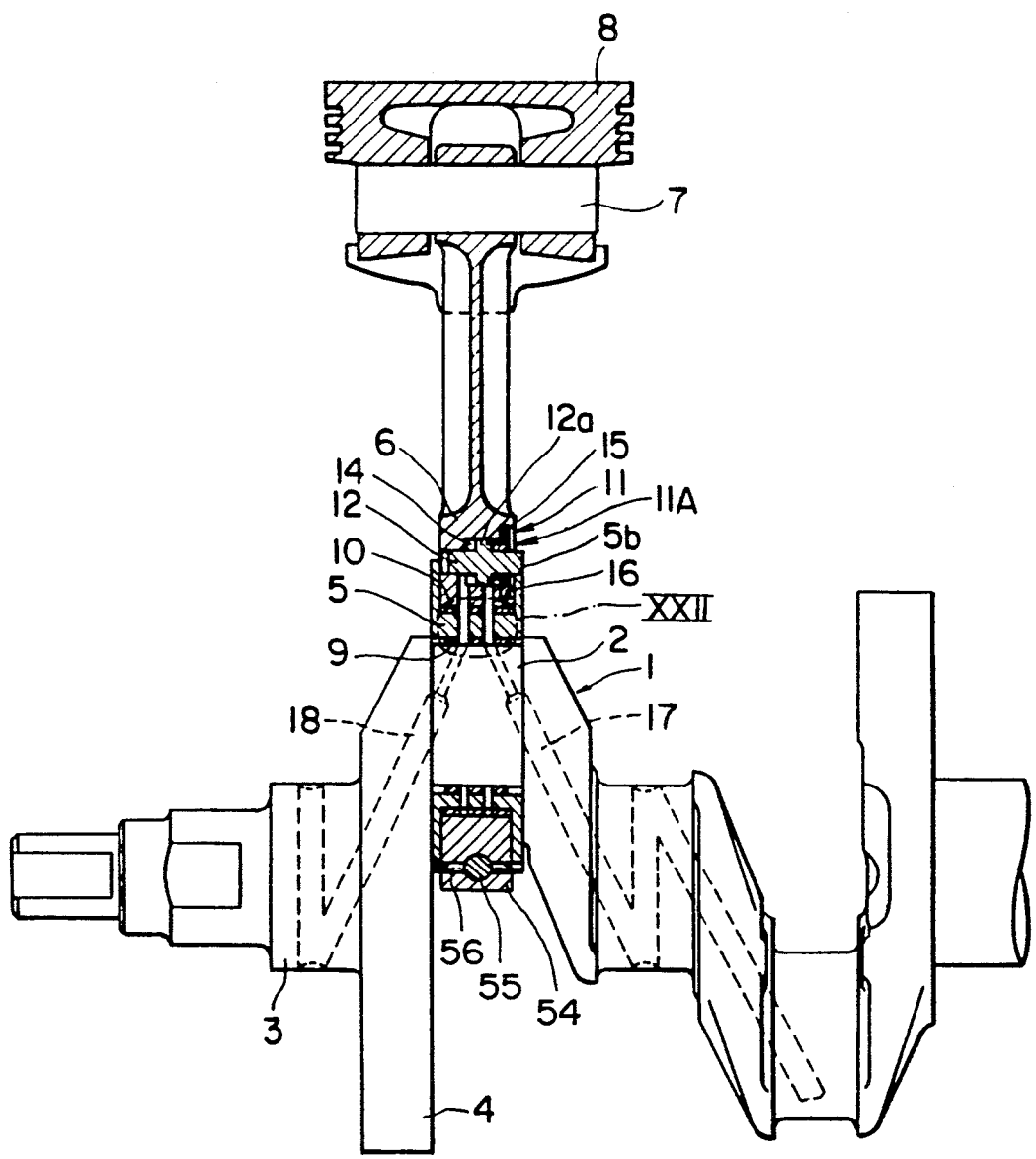
Figure 21:
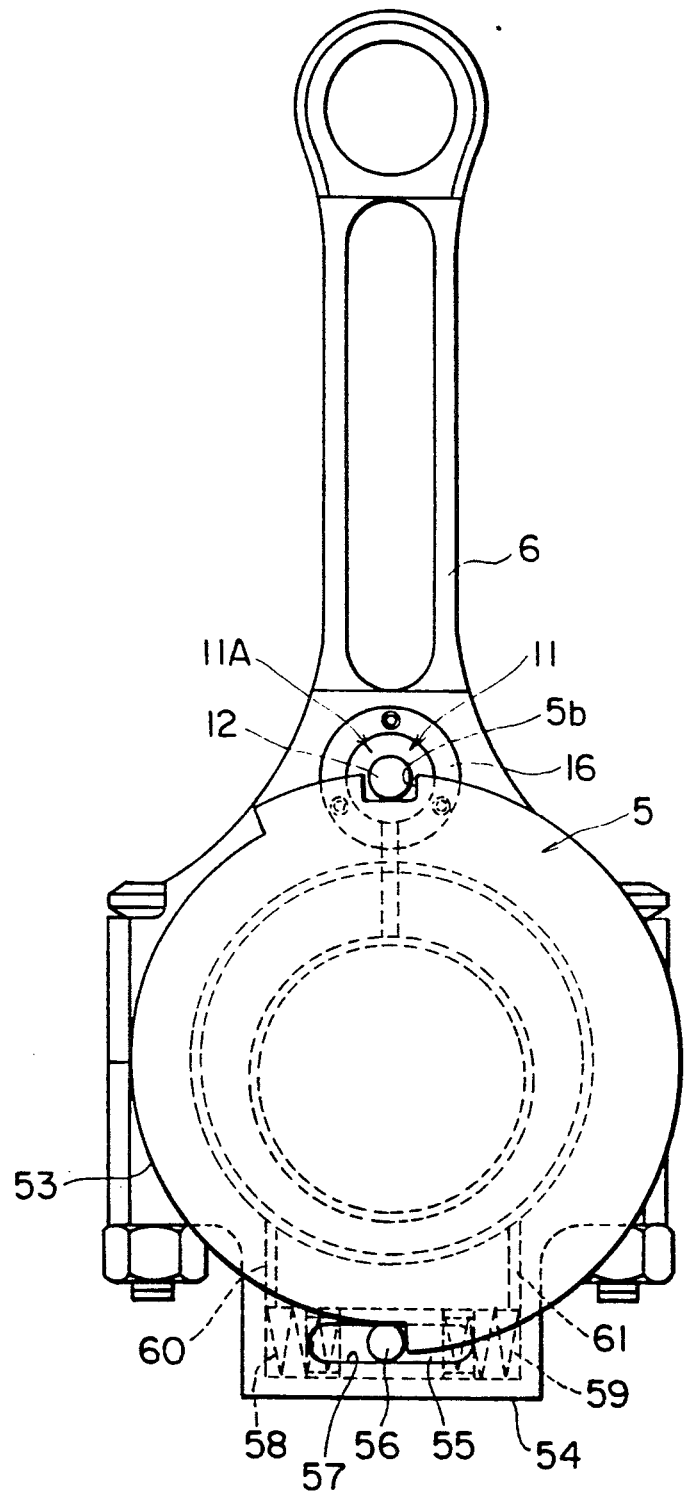

When the stopper pin 12 has moved rightwards and has taken the first position as shown in FIGS. 20 and 24, the stopper pin 12 engages the engagement portion 5b and the eccentric sleeve 5 is fixed at the maximum eccentric position on the big end of the connecting rod 6 as illustrated in FIGS. 20 and 21. When the stopper pin 12 has moved leftwards and has taken the second position as depicted in FIGS. 18 and 23, the stopper pin 12 engages the engagement portion 5a and the eccentric sleeve 5 is fixed at the minimum eccentric position on the big end of the connecting rod 6 as shown in FIGS. 18 and 19.

When the eccentric sleeve 5 is fixed near the maximum eccentric position on the big end of the connecting rod 6, the connecting rod 6 is brought into a state apparently most extended so that a high compression ratio state can be realized. When the eccentric sleeve 5 is fixed at the minimum eccentric position thereof on the big end of the connecting rod 6, the connecting rod 6 takes a state apparently most contracted so that a low compression ratio state can be realized. In the low compression ratio state, the compression ratio is chosen to be at a level such that the engine does not develop knocking. Such a compression ratio is substantially the same as a value set for conventional engines. In the high compression ratio state, the compression ratio is therefore set at a value higher than that set for conventional engines.

Also provided are the means for applying a prescribed fluid pressure (the standard fluid pressure) in advance to both the fluid pressure chambers 13,14 through the fluid pressure passages 17,18, respectively and the means for applying a fluid pressure (the standard fluid pressure+$\alpha$) higher than the above standard fluid pressure to the fluid pressure chamber 14 so as to move the stopper pin 12, which has the piston portion 12a integrated therewith, toward the fluid pressure chamber 13 against the biasing force of the return spring 15.

Figure 18:
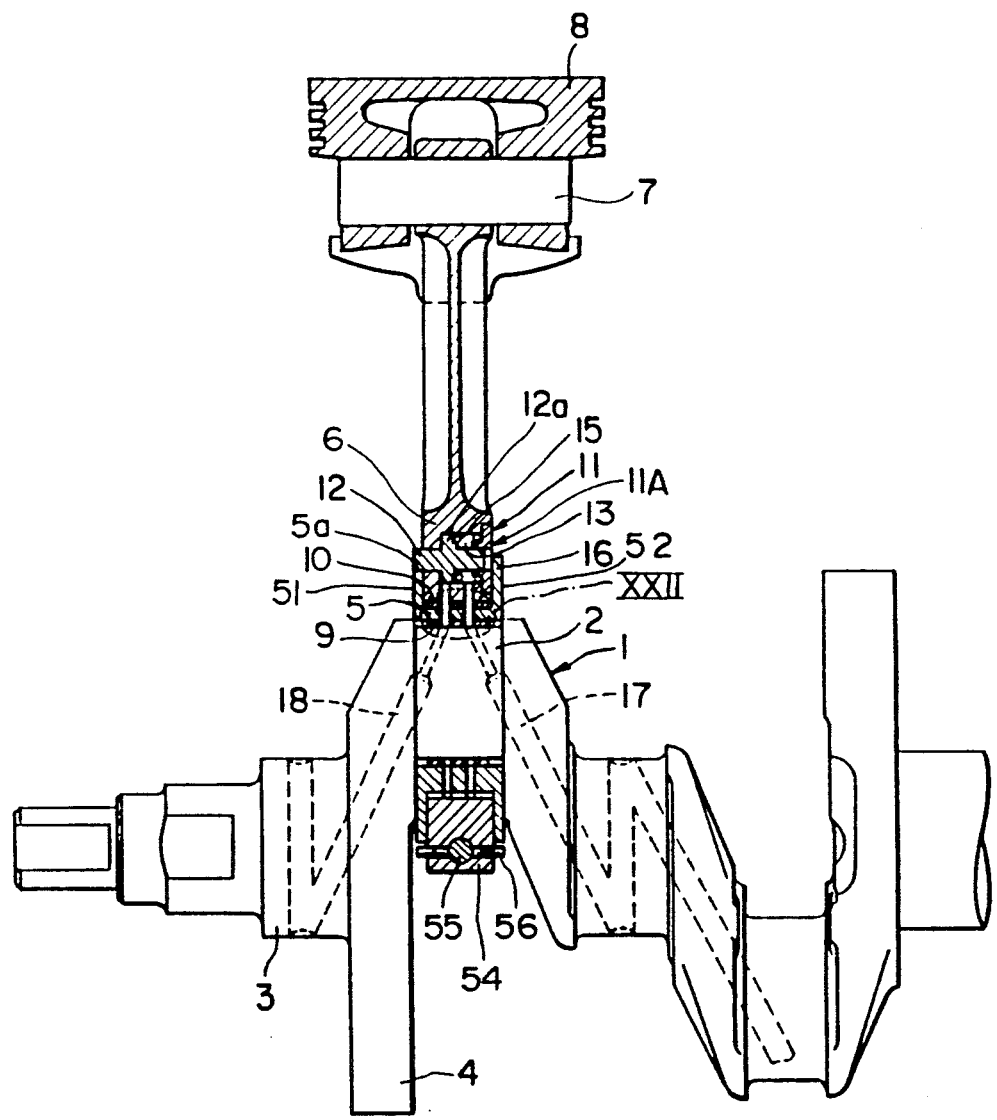

Namely, the fluid pressure passages 17,18 successively extend, as shown in FIGS. 18 and 20, through the crankjournal 3 of the crankshaft 1, the crankarm 4, the crankpin 2, the metal bearing 9, the eccentric sleeve 5, the metal bearing 9 and the big end of the connecting rod 6, and are connected to the fluid pressure chambers 13,14, respectively.

Relative sliding movements take place between the metal bearing 9 and the crankpin 2 and also between the metal bearing 10 and the eccentric sleeve 5. Accordingly, the inner peripheral wall of each of the metal bearings 9,10 defines two endless grooves which extend over 360° in the inner peripheral wall and are in communication with the fluid pressure passages 17,18, respectively. In addition, holes are formed through the wall of the metal bearing 9 in continuation with the respective grooves and hence in registration with the respective fluid pressure passages 17,18 which are formed in the eccentric sleeve 5. Further, similar holes are formed through the wall of the metal bearing 10 in continuation with the respective grooves and hence in registration with the respective fluid pressure passages 17,18 which are formed in the big end of the connecting rod 6.

Figure 25:
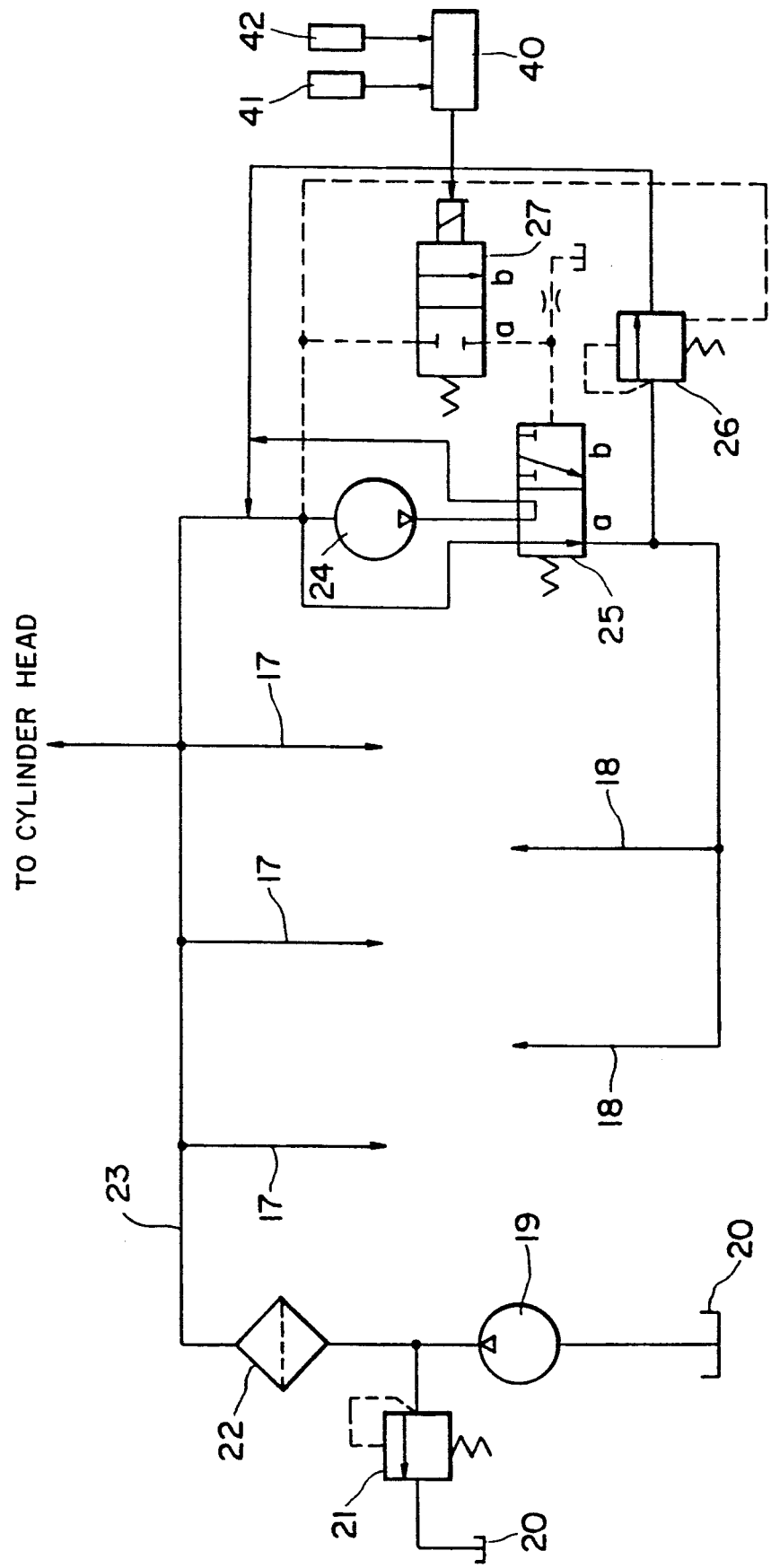

As is illustrated in FIG. 25, the fluid pressure passage 17 outside the crankshaft is connected to the side of the main gallery 23 and the fluid pressure passage 18 outside the crankshaft is connected to the side of the subordinate fluid pump 24 or to the side of the main gallery 23. Namely, the hydraulic fluid (e.g., a lubricating oil) from the fluid tank or fluid pan 20 is supplied as a hydraulic fluid of a desired fluid pressure (i.e., a fluid pressure for supplying the standard fluid pressure) by the fluid pump 19, which is provided with the relief valve, to the main gallery 23 via the fluid filter 22. From this main gallery 23, the hydraulic fluid of the standard fluid pressure is supplied through the fluid pressure passage 17. In addition, the hydraulic fluid from the main gallery 23 is supplied to the subordinate fluid pump 24 and is then discharged with a still higher fluid pressure (the standard fluid pressure+α). It is to be noted that either the fluid pressure from the subordinate fluid pump 24 or the fluid pressure from the main gallery 23 is selectively supplied to the fluid pressure passage 18 by way of the directional control valve 25. Namely, when the directional control valve 25 is set at position a as shown in FIG. 25, the standard fluid pressure is supplied from the main gallery 23 to the fluid pressure passage 18. When the directional control valve 25 is set at position b, the higher fluid pressure (the standard fluid pressure+α) from the subordinate fluid pump 24 is supplied to the fluid pressure passage 18. Namely, when the directional control valve 25 is set at position a as shown in FIG. 5, the standard fluid pressure from the main gallery 23 is supplied to the fluid pressure passage 18, but when the directional control valve 25 is set at position b, the fluid pressure passage 18 is supplied with the higher fluid pressure (the standard fluid pressure+α) from the subordinate fluid pump 24.

When the directional control valve 25 is set at position b, the higher fluid pressure (the standard fluid pressure+α) is therefore supplied from the subordinate fluid pump 24 to the fluid pressure passage 18 so that the higher fluid pressure is supplied to the fluid pressure chamber 14. Since the fluid pressure chamber 13 is provided with the standard fluid pressure from the main gallery 23 via the fluid pressure passage 17 at this time, the stopper pin 12 with the piston portion 12a integrated therewith is caused to move rightwards against the biasing force of the return spring 15 as shown in FIGS. 20 and 24 to assume the first position. As is depicted in FIGS. 20 and 21, the stopper pin 12 is hence brought into engagement with the engagement portion 5b whereby the eccentric sleeve 5 is fixed near the maximum eccentric position on the big end of the connecting rod 6. As a result, the connecting rod 6 is brought into the apparently most-extended state to realize the state of a high compression ratio.

When the directional control valve 25 is set at position a on the other hand, the fluid pressure passage 18 is supplied with the standard fluid pressure from the main gallery 23 so that this standard fluid pressure is also supplied to the fluid pressure chamber 14. Since the fluid pressure chamber 13 has already been supplied with the standard fluid pressure from the main gallery 23 by way of the fluid pressure passage 17, the stopper pin 12 with the piston portion 12a integrated therewith is caused to move leftwards under the biasing force of the return spring 15 as shown in FIGS. 19 and 23. Consequently, as is depicted in FIGS. 18 and 19, the stopper pin 12 is brought into engagement with the engagement portion 5a so that the eccentric sleeve 5 is fixed at the minimum eccentric position on the big end of the connecting rod 6. As a result, the connecting rod 6 is brought into the apparently most-contracted state so that the state of a low compression ratio can be realized.

Incidentally, the fluid pump 19 and the subordinate fluid pump 24 are both driven by an engine.

Designated at numeral 26 in FIG. 25 is the relief valve. This relief valve 26 serves to maintain constant the pressure difference α between (the standard fluid pressure+α) and the standard fluid pressure.

Numeral 27 indicates the fluid control valve for the directional control of the directional control valve 25. When the fluid control valve 27 is set at position a, the pilot fluid pressure for the directional control valve 25 is lowered so that the directional control valve 25 can be set at position a. When the oil control valve 27 is set at position b, the pilot fluid pressure for the directional control valve 25 is raised so that the directional control valve 25 can also be set at position b.

The fluid control valve 27 is inputted with a directional control signal from the controller 40. The controller 40 outputs such a control signal as to set the fluid control valve 27 at position a when the controller 40 detects a high engine load range higher than the medium engine load range or a high engine speed range upon receipt of detection signals from the engine load sensor 41 and the engine speed (revolution number) sensor 42. Upon detection of an engine load range equal to or lower than the medium engine load range, the controller 40 however outputs such a control signal as to set the fluid control valve 27 at position b.

Owing to the above construction, upon detection of a range equal to or lower than the medium engine load range, a control signal is outputted such that the fluid control valve 27 is set at position b. Accordingly, the directional control valve 25 is also set at position b so that the higher fluid pressure (the standard fluid pressure+α) from the fluid pump 24 is supplied to the fluid pressure passage 18 and this higher fluid is hence supplied to the fluid pressure chamber 14. Since the fluid pressure chamber 13 has already been supplied with the standard fluid pressure from the main galley 23 through the fluid pressure passage 17 at this time, the pressure difference α between the higher the standard fluid pressure is applied to the piston portion 12a as a result. This pressure difference α then causes the stopper pin 12, which has the piston portion 12a integrated therewith, to move rightwards against the biasing force of the return spring 15 as shown in FIGS. 20 and 24. As a result, the stopper pin 12 assumes the first position and, as depicted in FIGS. 20 and 21, the stopper pin 12 is brought into engagement with the engagement portion 5b so that the eccentric sleeve 5 is fixed near the maximum eccentric position on the big end of the connecting rod 6. Here, upon engagement of the stopper pin 12 and the engagement portion 5b, the pins 56 are brought into contact with angular end edges of the corresponding notched guide portions 53 so that any shock caused by the above engagement can be absorbed by the damping function of the hydraulic fluid. Hence, the connecting rod 6 is brought into the apparently most-extended state without receipt of any substantial impact at the stopper pin 12 whereby the state of a high compression ratio is realized. Conversion into such a high compression ratio state in the manner described above improves the thermal efficiency, whereby improvements in the fuel cost and the like can be expected.

Upon detection of a range higher than the medium engine load range or a high engine speed range, a control signal is outputted such that the fluid control valve 27 is set at position a. Accordingly, the directional control valve 25 is also set at position a so that the standard fluid pressure from the main gallery 23 is supplied to both the fluid pressure passages 17 and 18 and the fluid pressure chambers 13,14 are supplied with the standard fluid pressure. By the biasing force of the return spring 15, the stopper pin 12 having the piston portion 12a integrated therewith is hence caused to move leftwards as shown in FIGS. 19 and 23. As a result, the stopper pin 12 assumes the second position and, as depicted in FIGS. 18 and 19, the stopper pin 12 is brought into engagement with the engagement portion 5a so that the eccentric sleeve 5 is fixed at the minimum eccentric position on the big end of the connecting rod 6. Here, upon engagement of the stopper pin 12 and the engagement portion 5a, the pins 56 are brought into contact with the other angular end edges of the corresponding notched guide portions 53 so that any shock caused by the above engagement can be absorbed by the damping function of the hydraulic fluid. As a result, the connecting rod 6 is brought into the apparently most-contracted state without receipt of any substantial shock at the stopper pin 12 whereby the state of a low compression ratio is realized. Conversion into such a low compression ratio state makes it possible to avoid knocking without failure.

In each of the above embodiments, the drive means for the eccentric sleeve lock means 11 or 29 and the stopper pin 12 or 30 employed a hydraulic: fluid such as a working oil. Other fluids (liquids or gases) of a desired pressure can also be used.

As a system for driving the stopper pin 12 or 30, a drive system making use of the electromagnetic principle (for example, electromagnetic force) can also be used in place of such fluid pressure drive systems as described above.

What is claimed is:

1. A variable compression ratio apparatus for an internal combustion engine having at least one cylinder, a piston reciprocally disposed within the cylinder and a connecting rod pivotally connected at one end thereof to the piston and at the other end thereof to a crankshaft, comprising:

an eccentric sleeve rotatably arranged in one of pivot portions at opposite ends of the connecting rod so as to make a bearing hole of the connecting rod and a pin, which extends through the bearing hole, eccentric relative to each other; and an eccentric sleeve lock means capable of fixing rotation of the eccentric sleeve at a desired position, said eccentric sleeve lock means comprising:

a pin member engageable with one of engagement portions formed in the eccentric sleeve, and a piston-type fluid pressure drive system having a means for producing a pressure difference between fluid pressure chambers formed at opposite sides of a piston portion, which is connected to the pin member, in a state that the fluid pressure chambers are simultaneously applied with a prescribed fluid pressure, whereby the piston portion is moved to drive the pin member.

2. The apparatus of claim 1, wherein the piston-type fluid pressure drive system has:

a return spring provided in one of the fluid pressure chambers, thereby biasing the piston portion such that the piston portion is moved toward the other fluid pressure chamber;

a means for applying the prescribed fluid pressure to the fluid pressure chambers; and a means for subsequently applying a fluid pressure, which is higher than the prescribed fluid pressure, to the other fluid pressure chamber so as to move the piston portion toward the one fluid pressure chamber against the biasing force of the return spring.

3. The apparatus of claim 2, further comprising a first fluid passage connected to one of the fluid pressure chambers and a second fluid passage connected to the other fluid pressure chamber, whereby a working fluid of a desired pressure is supplied through the first fluid passage, said second fluid passage being provided with a directional control valve so that a working fluid of a desired pressure or a working fluid of a pressure higher than the last-mentioned desired pressure is supplied by way of the directional control valve.

4. The apparatus of claim 3, further comprising a control valve for performing directional control of the directional control valve by changing a pilot fluid pressure to the directional control valve.

5. The apparatus of claim 1, wherein the piston-type fluid pressure drive system is provided with a means for applying fluid pressures to the respective fluid pressure chambers such that a pressure difference is produced between the fluid pressure chambers while a desired fluid pressure exists even on the low pressure side, said means being capable of performing switching between a first state in which the fluid pressure of one of the fluid pressure chambers is higher and a second state in which the fluid pressure of the other fluid pressure chamber is higher.

6. The apparatus of claim 5, further comprising a first fluid passage connected to one of the fluid pressure chambers and a second fluid passage connected to the other fluid pressure chamber, said first and second fluid passages being provided with a common directional control valve whereby a working fluid of a desired pressure or a working fluid of a pressure higher than the last-mentioned desired pressure is selectively supplied to one of the first fluid passage and the second fluid passage by way of the common directional control valve.

7. The apparatus of claim 6, further comprising a control valve for performing directional control of the common directional control valve by changing a pilot fluid pressure to the common directional control valve.

8. A variable compression ratio apparatus for an internal combustion engine having at least one cylinder, a piston reciprocally disposed within the cylinder and a connecting rod pivotally connected at one end thereof to the piston and at the other end thereof to a crankshaft, comprising:

an eccentric sleeve rotatably arranged in a pivot portion at the other end of the connecting rod so as to make a bearing hole of the connecting rod and the crankshaft, which extends through the bearing hole, eccentric relative to each other; and an eccentric sleeve lock means capable of fixing rotation of the eccentric sleeve at a desired position, said eccentric sleeve lock means comprising:

a pair of flange portions formed to flank the connecting rod at opposite ends of the eccentric sleeve, a pin member provided inside the connecting rod such that the pin member is allowed to project toward one of the flange portions, a first engagement portion provided on one of the flange portions and engageable with the pin member when the pin member projects out toward said one of the flange portions, a second engagement portion provided on the other flange portion and engageable with the pin member when the pin member projects out toward the other flange portion, and a piston-type fluid pressure drive system having a means for producing a pressure difference between fluid pressure chambers formed at opposite sides of a piston portion, which is connected to the pin member, in a state that the fluid pressure chambers are applied with a prescribed fluid pressure, whereby the piston portion is moved along an axis of the eccentric sleeve to drive the pin member such that the pin member is allowed to project out from the connecting rod toward one of the flange portions.

9. The apparatus of claim 8, wherein the connecting rod defines a through-hole extending in parallel with the bearing hole of the connecting rod, the pin member is inserted in the through-hole and is centrally enlarged in diameter to form the piston portion, the through-hole is formed as a three-stage hole portion having a small-diameter hole portion with one end portion of the pin member inserted fluid tight therein, a medium-diameter hole portion with the piston portion received therein and a large-diameter portion with a cap fitted therein, the cap defines therein a through-opening into which the other end portion of the pin member can be inserted fluid tight, and the two fluid pressure chambers are formed in the medium-diameter portion, whereby the medium-diameter portion is formed as a cylinder portion.

10. The apparatus of claim 8, wherein the first engagement portion and the second engagement portion are arranged at positions angularly spaced from each other.

11. The apparatus of claim 8, further comprising a first metal bearing interposed between the bearing hole of the connecting rod and the eccentric sleeve and a second metal bearing interposed between the eccentric sleeve and the crankshaft.

12. The apparatus of claim 11, wherein each of the first and second metal bearings defines endless fluid passages for supplying a working fluid to the fluid pressure chambers, respectively.

13. The apparatus of claim 8, wherein engagement of the pin member with the first engagement portion produces a high compression ratio state or a low compression ratio state while engagement of the pin member with the second engagement portion produces a low compression ratio state or a high compression ratio state.

14. The apparatus of claim 13, wherein the high compression ratio state is produced in a low-to-medium load range of the engine and the low compression ratio state is produced in a high load range of the engine.

15. The apparatus of claim 8, further comprising:
cut-off guide portions formed by cutting off the flange portions at peripheral edge portions thereof over a prescribed distance in the angular directions thereof;
pins guided by the cut-off guide portions, respectively; and
a means for absorbing a shock which may be produced upon contact of the pins with angular ends of the cut-off guide portions.

16. The apparatus of claim 15, wherein said shock absorbing means comprises:
a cylinder portion formed in the connecting rod and defining slot-like window portions open at walls of the connecting rod, said walls facing the flange portions, respectively;
a piston member fitted in the cylinder portion and carrying the pins such that the pins project out through the window portions, respectively; and
springs disposed within the cylinder portion so as to bias the piston member at opposite ends thereof, respectively.

17. The apparatus of claim 16, wherein spring compartments defined by the piston member within the cylinder and enclosing the springs, respectively are filled with a hydraulic fluid which can be charged or discharged through passage.

18. The apparatus of claim 17, wherein the passages connected to the respective spring compartments are formed as orifice passages, respectively.

19. A variable compression ratio apparatus for an internal combustion engine having at least one cylinder, a piston reciprocally disposed within the cylinder and a connecting rod pivotally connected at one end thereof to the piston and at the other end thereof to a crankshaft, comprising:
an eccentric sleeve rotatably arranged in a pivot portion at said one end of the connecting rod so as to make a bearing hole of the connecting rod and a piston pin, which extends through the bearing hole, eccentric relative to each other; and
an eccentric sleeve lock means capable of fixing rotation of the eccentric sleeve at a desired position, said eccentric sleeve lock means comprising:
a pin member provided inside the connecting rod movably from the inside of the connecting rod in a direction at an angle to the longitudinal axis of the eccentric sleeve such that the pin member is allowed to project out toward the eccentric sleeve,
first and second engagement portions formed on the eccentric sleeve with a desired angular interval therebetween, one of said first and second engagement portions being engageable with the pin member when the pin member projects out toward the eccentric sleeve; and
a piston-type fluid pressure drive system having a means for producing a pressure difference between fluid pressure chambers formed at opposite sides of a piston portion, which is connected to the pin member, in a state that the fluid pressure chambers are simultaneously applied with a prescribed fluid pressure, whereby the piston portion is moved to drive the pin member such that the pin member is allowed to project out from the inside of the connecting rod toward the eccentric sleeve.

20. The apparatus of claim 19, wherein engagement of the pin member with the first engagement portion produces a high compression ratio state or a low compression ratio state while engagement of the pin member with the second engagement portion produces a low compression ratio state or a high compression ratio state.

21. The apparatus of claim 20, wherein the high compression ratio state is produced in a low-to-medium load range of the engine and the low compression ratio state is produced in a high load range of the engine.

22. A variable compression ratio apparatus for an internal combustion engine having at least one cylinder, a piston reciprocally disposed within the cylinder and a connecting rod pivotally connected at one end thereof to the piston and at the other end thereof to a crankshaft, comprising:
an eccentric sleeve rotatably arranged in either one of pivot portions at both the ends of the connecting rod so as to make a bearing hole of the connecting rod and a pin, which extends through the bearing hole, eccentric relative to each other; and
an eccentric sleeve lock means for actuating a pin member, which is movable parallel to a longitudinal axis of the eccentric sleeve, such that the pin member is brought into engagement with one of engagement portions formed in the eccentric sleeve and rotation of the eccentric sleeve is fixed at a desired position.

* * * * *